United States Patent
Anzai et al.

(10) Patent No.: US 9,495,717 B2
(45) Date of Patent: Nov. 15, 2016

(54) PLANT SAFETY DESIGN ASSISTANCE DEVICE AND PLANT MONITORING AND MAINTENANCE ASSISTANCE DEVICE

(75) Inventors: Fumikado Anzai, Tokyo (JP); Kenichi Morimoto, Tokyo (JP); Yoshikane Yamanaka, Tokyo (JP)

(73) Assignee: MITSUBISHI HEAVY INDUSTRIES, LTD., Minato-Ku, Tokyo (JP)

( * ) Notice: Subject to any disclaimer, the term of this patent is extended or adjusted under 35 U.S.C. 154(b) by 529 days.

(21) Appl. No.: 13/988,199

(22) PCT Filed: Aug. 25, 2011

(86) PCT No.: PCT/JP2011/069139
§ 371 (c)(1),
(2), (4) Date: Aug. 12, 2013

(87) PCT Pub. No.: WO2012/098727
PCT Pub. Date: Jul. 26, 2012

(65) Prior Publication Data
US 2013/0332383 A1  Dec. 12, 2013

(30) Foreign Application Priority Data
Jan. 20, 2011  (JP) .................. 2011-009433

(51) Int. Cl.
G06Q 50/26 (2012.01)
G06Q 10/10 (2012.01)
(Continued)

(52) U.S. Cl.
CPC ......... G06Q 50/265 (2013.01); G05B 23/0275 (2013.01); G05B 23/0283 (2013.01);
(Continued)

(58) Field of Classification Search
CPC .... G06Q 50/265; G06Q 10/06; G06Q 10/10; G06Q 50/04; G05B 23/0275; G05B 23/0283
See application file for complete search history.

(56) References Cited

U.S. PATENT DOCUMENTS 4,632,802 A * 12/1986 Herbst .................. G21C 17/00
376/216
6,947,675 B2  9/2005 Koyama
(Continued)

FOREIGN PATENT DOCUMENTS

CN  101097436 A  1/2008
CN  101498936 A  8/2009
(Continued)

OTHER PUBLICATIONS

China Patent Office, "Office Action for CN 201180057130.3," Nov. 3, 2014.
(Continued)

Primary Examiner — John Breene
Assistant Examiner — Mohammad Islam
(74) Attorney, Agent, or Firm — Manabu Kanesaka

(57) ABSTRACT

A Plant safety design assistance device (100) is configured by a communication device (140), a diagnostics and monitoring device (110), a fault inspection management device (120), and a design and manufacturing device (130) being interconnected via network (150). The diagnostics and monitoring device (110) receives plant status information (dc) from a plant control system (1) and carries out monitoring and diagnostics an the plant. The fault inspection management device (120) maintains fault inspection information (D2) of an apparatus which is used in the plant. The design and manufacturing device (130) maintains design and manufacturing information of the apparatus which is used in the plant. The design and manufacturing devise (130) receives the fault inspection information (D2) from the fault inspection management device (120), and carries out a plant safety design which takes the fault inspection information into account. The plant safety design is thus assisted, with the plant monitoring and maintenance activities being linked therewith.

9 Claims, 22 Drawing Sheets

(51) Int. Cl.
  *G05B 23/02* (2006.01)
  *G06Q 50/04* (2012.01)
  *G06Q 10/06* (2012.01)

(52) U.S. Cl.
  CPC .............. *G06Q10/06* (2013.01); *G06Q 10/10* (2013.01); *G06Q 50/04* (2013.01); *G05B 2219/32226* (2013.01); *G05B 2219/32234* (2013.01); *G05B 2219/32235* (2013.01); *Y02P 90/14* (2015.11); *Y02P 90/30* (2015.11)

(56) References Cited

U.S. PATENT DOCUMENTS

| | | | |
|---|---|---|---|
| 6,955,039 B2 | 10/2005 | Nomura et al. | |
| 7,143,011 B2 | 11/2006 | Yoshie et al. | |
| 7,747,905 B2 | 6/2010 | Odani | |
| 8,213,318 B2 | 7/2012 | Ooba et al. | |
| 8,509,935 B2 | 8/2013 | Hoyte et al. | |
| 2003/0004656 A1* | 1/2003 | Bjornson | G05B 23/0278 702/34 |
| 2003/0115510 A1* | 6/2003 | Takayama | G05B 23/0283 714/47.1 |
| 2004/0225474 A1* | 11/2004 | Goldfine | G01N 27/9046 702/183 |
| 2005/0149289 A1* | 7/2005 | Whaling | G06Q 10/06 702/181 |
| 2008/0255682 A1* | 10/2008 | Zhao | G05B 19/4184 700/30 |
| 2009/0012631 A1* | 1/2009 | Fuller | G05B 9/02 700/1 |
| 2009/0077055 A1 | 3/2009 | Dillon et al. | |
| 2009/0217101 A1 | 8/2009 | Becker | |
| 2010/0057402 A1* | 3/2010 | Dausend | G05B 23/0283 702/184 |

FOREIGN PATENT DOCUMENTS

| | | |
|---|---|---|
| EP | 1589391 A2 | 10/2005 |
| JP | H01-199194 A | 8/1989 |
| JP | H07-72922 A | 3/1995 |
| JP | 3190492 B2 | 5/2001 |
| JP | 2001-282343 A | 10/2001 |
| JP | 2003-022125 | 1/2003 |
| JP | 2003-067042 A | 3/2003 |
| JP | 2003-114294 A | 4/2003 |
| JP | 3455681 B2 | 10/2003 |
| JP | 3637331 B2 | 4/2005 |
| JP | 2007-114907 A | 5/2007 |
| JP | 2007-128440 A | 5/2007 |
| JP | 4056232 B2 | 3/2008 |
| JP | 4326223 B2 | 6/2009 |
| JP | 4326223 B2 | 9/2009 |
| JP | 4402613 B2 | 1/2010 |
| JP | 2010-97392 A | 4/2010 |
| KR | 10-0522342 B1 | 10/2005 |
| WO | 03075206 A2 | 9/2003 |

OTHER PUBLICATIONS

International Search Report (PCT/ISA/210).
Written Opinion of the International Searching Authority (PCT/IB/338).
PCT, "Intenational Search Report for PCT/JP2011/069139", Sep. 20, 2011.
Korea Patent Office, "Office Action for KR 10-2013-7014132," May 29, 2014.
Europe Patent Office, Search Report for European Patent Application No. 11856403.8, May 31, 2016.

\* cited by examiner

Fig.5

PLANT APPARATUS CONFIGURATION INFORMATION DATABASE 121a

| APPARATUS ID | SERIAL NO. | APPARATUS NAME | INSTALLATION SITE |
|---|---|---|---|
| 1 | 123 | APPARATUS A | SYSTEM 1 |
| 2 | 345 | SENSOR B | GAS TURBINE |
| 3 | 456 | CIRCUIT C | LogicSolver |
| ... | ... | ... | ... |

ALERT INFORMATION CORRESPONDENCE DATABASE 121b

| ALERT INFORMATION CODE | CAUSE CODE | CAUSE | SITE TO BE INSPECTED | COUNTERMEASURE |
|---|---|---|---|---|
| A-123 | A-123-1 | VALVE STICKING | CONTROL VALVE | REPLACEMENT |
| B-234 | B-234-1 | DIRT ADHESION | LIGHT-EMITTING PART | CLEANING |
| C-345 | C-345-1 | SIGNAL STOP | CURRENT | BOARD REPLACEMENT |
| C-345 | C-345-2 | POWER REDUCTION | VOLTAGE | POWER SUPPLY REPLACEMENT |
| C-345 | C-345-3 | POWER FLUCTUATION | VOLTAGE | OBSERVATION |
| ... | ... | ... | ... | ... |

FAULT INSPECTION INFORMATION DATABASE 121c

| EVENT ID | APPARATUS ID | SERIAL NO. | DATA AND TIME | PERSON IN CHARGE | FAULT INPSECTION REASON | CAUSE CODE | COUNTERMEASURE | RESULT |
|---|---|---|---|---|---|---|---|---|
| 1 | 1 | 123 | xx:xx:xx:xx | α | ALERT INFORMATION CODEA-123 | A-123-1 | REPLACEMENT | NORMAL |
| 2 | 2 | 345 | xx:xx:xx:xx | β | ALERT INFORMATION CODEB-234 | B-234-1 | CLEANING | NORMAL |
| 3 | 3 | 456 | xx:xx:xx:xx | γ | REGULAR INSPECTION | C-345-3 | OBSERVATION | NO ABNORMALITY |
| 4 | 3 | 456 | xx:xx:xx:xx | γ | REGULAR INSPECTION | C-345-2 | – | BEFORE INSPECTION |
| 5 | 3 | 456 | xx:xx:xx:xx | γ | REGULAR INSPECTION | C-345-3 | – | BEFORE INSPECTION |
| ... | ... | ... | ... | ... | ... | ... | ... | ... |

| APPARATUS ID | SERIAL NO. | APPARATUS NAME | INSTALLATION SITE |
|---|---|---|---|
| 1 | 123 | APPARATUS A | SYSTEM 1 |
| 2 | 345 | SENSOR B | GAS TURBINE |
| 3 | 456 | CIRCUIT C | LogicSolver |

HARDWARE COMPONENT CONFIGURATION TABLE

| APPARATUS ID | COMPONENT ID | COMPONENT NAME | FAULT RATE |
|---|---|---|---|
| 3 | 1 | CAPACITOR | 1.00E-10 |
| 3 | 2 | COIL | 1.00E-10 |
| 3 | 3 | CPU | 1.00E-10 |

REPLACEMENT COMPONENT CONFIGURATION TABLE

| COMPONENT ID | REPLACEMENT COMPONENT ID | MODEL NUMBER | MANUFACTURER | FAULT RATE |
|---|---|---|---|---|
| 1 | 1 | C-123 | COMPANY A | 1.00E-10 |
| 1 | 2 | C-456 | COMPANY B | 1.00E-10 |
| 1 | 3 | C-789 | COMPANY C | 1.00E-10 |

SOFTWARE CONFIGURATION TABLE

| APPARATUS ID | SOFTWARE VER. | HISTORY | STATUS |
|---|---|---|---|
| 3 | 1.00 | NEW | NOT AVAILABLE |
| 3 | 1.10 | PROGRAM A UPDATE | NOT AVAILABLE |
| 3 | 1.20 | DATABASE B UPDATE | LATEST |

SOURCE CODE CONFIGURATION TABLE

| SOFTWARE VER. | PRGRAM | FILE NAME | VERSION |
|---|---|---|---|
| 1.20 | PROGRAM A | xxx.c | 1.00 |
| | DATABASE B | xx.mdb | 1.10 |
| | KERNEL C | xx.S | 1.20 |

Fig.22

PLANT APPARATUS CONFIGURATION INFORMATION DATABASE

| APPARATUS ID | SERIAL NO. | APPARATUS NAME | INSTALLATION SITE |
|---|---|---|---|
| 1 | 123 | APPARATUS A | SYSTEM 1 |
| 2 | 345 | SENSOR B | GAS TURBINE |
| 3 | 456 | CIRCUIT C | LogicSolver |
| ... | ... | ... | ... |

221a

ALERT INFORMATION CORRESPONDENCE DATABASE

| ALERT INFORMATION CODE | CAUSE CODE | CAUSE | SITE TO BE INSPECTED | COUNTERMEASURE |
|---|---|---|---|---|
| A-123 | A-123-1 | VALVE STICKING | CONTROL VALVE | REPLACEMENT |
| B-234 | B-234-1 | DIRT ADHESION | LIGHT-EMITTING PART | CLEANING |
| C-345 | C-345-1 | SIGNAL STOP | CURRENT | BOARD REPLACEMENT |
| C-345 | C-345-2 | POWER REDUCTION | VOLTAGE | POWER SUPPLY REPLACEMENT |
| C-345 | C-345-3 | POWER FLUCTUATION | VOLTAGE | OBSERVATION |
| ... | ... | ... | ... | ... |

221b

FAULT INSPECTION INFORMATION DATABASE

| EVENT ID | APPARATUS ID | SERIAL NO | DATA AND TIME | PERSON IN CHARGE | FAULT INPSECIONT REASON | CAUSE CODE | COUNTERMEASURE | RESULT |
|---|---|---|---|---|---|---|---|---|
| 1 | 1 | 123 | xxxx:xxxxx | α | ALERT INFORMATION CODE A-123 | A-123-1 | REPLACEMENT | NORMAL |
| 2 | 2 | 345 | xxxx:xxxxx | β | ALERT INFORMATION CODE B-234 | B-234-1 | CLEANING | NORMAL |
| 3 | 3 | 456 | xxxx:xxxxx | γ | REGULAR INSPECTION | C-345-3 | OBSERVATION | NO ABNORMALITY |
| 4 | 3 | 456 | xxxx:xxxxx | γ | REGULAR INSPECTION | C-345-2 | — | BEFORE INSPECTION |
| 5 | 3 | 456 | xxxx:xxxxx | γ | REGULAR INSPECTION | C-345-3 | — | BEFORE INSPECTION |
| ... | ... | ... | ... | ... | ... | ... | ... | ... |

221c

221

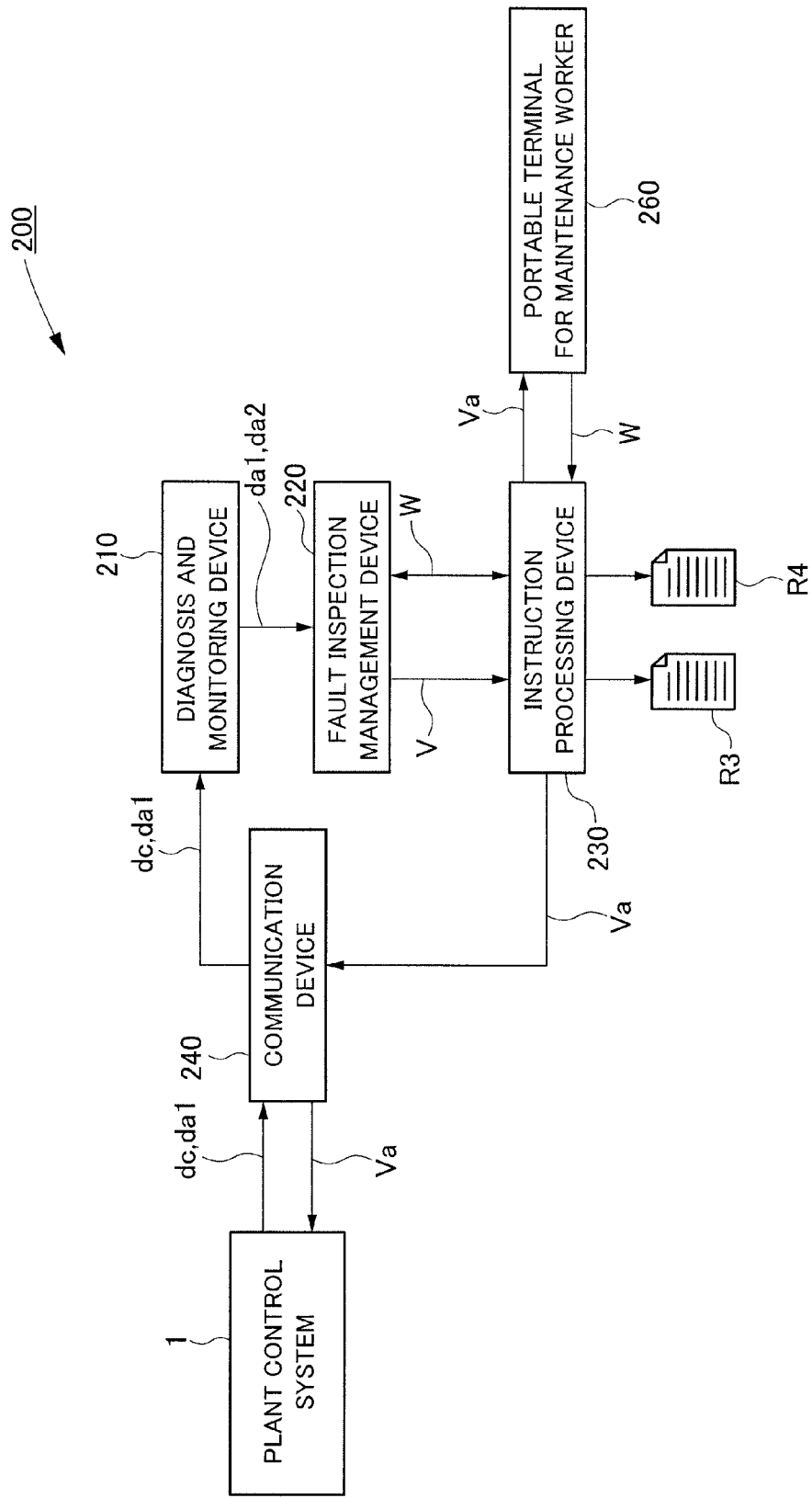

PLANT SAFETY DESIGN ASSISTANCE DEVICE AND PLANT MONITORING AND MAINTENANCE ASSISTANCE DEVICE

RELATED APPLICATIONS

The present application is National Phase of International Application No. PCT/JP2011/069139, filed Aug. 25, 2011, and claims priority from, Japanese Application No. 2011-009433, filed Jan. 20, 2011.

TECHNICAL FIELD

This invention relates to a plant safety design assistance device and a plant monitoring and maintenance assistance device.

BACKGROUND ART

Thermal power plants, factory production lines, buildings, large air-conditioning facilities, and the like, have an enormous number of apparatuses of various sizes, components, piping, and the like.

In such a plant, in order to ensure proper operation, it is necessary to detect abnormalities, perform power-saving operation, perform conservation and maintenance, and send maintenance workers or the like to a fault site at the time of a fault.

Therefore, conventionally, for the purpose of the ensuring of proper operation of a plant mentioned above, or the like, various types of inventions/suggestions have been made.

For example, in order to perform proper operation of a plant, an operator monitors and analyzes plant status data, and regulates the operating status on the basis of the analysis result.

In addition, a device detecting abnormalities from working situations of a plant (Japanese Patent No. 4402613) or a device detecting a sign of an abnormality and making an adjustment (Japanese Patent No. 4056232) have been suggested.

In addition, there is telemonitoring using Internet technologies for the purpose of power-saving plant operation (Japanese Patent No. 3455681, Japanese Patent No. 3637331).

Further, a system assisting establishment of a conservation plan of an apparatus or piping has been suggested (Japanese Patent No. 4326223).

Conventionally, such a technique is used to make a maintenance plan and carry out inspection.

Furthermore, when an abnormality of a plant is found by telemonitoring, an observer reports the situation to a maintenance worker, and the maintenance worker rushes to the plant, inspects the situation, and carries out repairs or the like.

CITATION LIST

Patent Literature

Patent Literature 1: Japanese Patent No. 4402613
Patent Literature 2: Japanese Patent No. 4056232
Patent Literature 3: Japanese Patent No. 3455681
Patent Literature 4: Japanese Patent No. 3637331
Patent Literature 5: Japanese Patent No. 4326223

SUMMARY OF INVENTION

Technical Problem

By the way, a plant monitoring/maintenance activity and a plant design activity have different phases of product lifecycles from each other, and therefore information exchange between the monitoring/maintenance activity and the design activity is difficult. For this reason, there is the problem that it is impossible to feed back sufficiently a finding obtained by the monitoring/maintenance activity to improve the quality of the plant design.

For example, phases of a product lifecycle in a thermal power plant include "plan", "design", "manufacture", "site installation", "examination before practical operation", "commercial (practical) operation", "monitoring/maintenance/inspection during practical operation", and "after-sales service". In the respective phases, their individual experts/specialized organizations perform activities using their own systems.

At this time, a plant control system or the like, for example, is immediately efficiently improved/evolved into a plant system with high reliability and safety by remaking or modifying a "plan" or "design" based on information obtained by "monitoring/maintenance/inspection during practical operation", and eventually it is possible to objectively prove that the system keeps a safety level or safety category that is an international index.

Conventionally, however, "monitoring/maintenance/inspection during practical operation" and "design" cannot immediately efficiently coordinate with each other, and "monitoring/maintenance/inspection during practical operation" and "assistance of dispatch of maintenance workers" cannot immediately efficiently coordinate with each other, either, and therefore an efficient system has been demanded.

Further, in view of safety, in the opinion of the managers of plants or facilities, it is required to efficiently extract useful information for improvement/evolution toward a more safe product. Manager's opinions are collected/managed conventionally, but still not immediately efficiently coordinated.

That is, a design assistance system, a production management system, an examination data system, and the like, are configured as individual systems, but coordinating such a plurality of systems so that the functions or the like of one system are modified/designed by reference to the status of another system is not conventionally performed.

In addition, in particular, now, such a plant system as conforms to an international functional safety standard (IEC61508 or ISO138849 or JIS C 0508 or JIS B 9705) requires an arrangement that makes it possible to overcome the above problems and keep a safety level or a safety category.

Further, such international standards require controlling to ensure that determinations of safety requirements specifications made in the plan phase are reflected/executed in the design or maintenance/inspection activities.

Further, at the site of a plant, an expert (designer/installer) knowing the details of the plant might be absent. In addition, there is not always such an advanced analyzer or automatic regulator as to be capable of detecting a sign of an abnormality.

In a telemonitoring center, past operation history of a plant to be monitored is stored, but periodic examination results or repair information are not accumulated. Such information (periodic examination results or repair information) are stored at a maintenance section of a power company or the like which is the owner of the plant or at a quality assurance section of a manufacturer.

Therefore, there is the problem that the expert or maintenance worker does not have such information as results of past examination of the plant/apparatus or repair details, and thus has to make a determination/determine a response only on the basis of situations on the ground.

Further, this also results in the problem that an appropriate instruction/repair cannot immediately be made, the problem that a necessary equipment/replacement component cannot immediately be supplied, or the problem that how to deal with troubles cannot be standardized and thus the cost increases.

After all, conventionally, the information on the telemonitoring system or the maintenance planning system is not coordinated with the plant safety design assistance system or the plant monitoring and maintenance assistance system.

In view of the above conventional techniques, an object of the present invention is to provide a plant safety design assistance device capable of assisting plant safety design in cooperation with plant monitoring and maintenance activities, and a plant monitoring and maintenance assistance device capable of assisting a plant examination instruction in cooperation with plant diagnosis and monitoring or fault inspection activities.

Solution to Problems

A configuration of a plant safety design assistance device of the present invention solving the above problems is characterized in that:

a communication device (140), a diagnosis and monitoring device (110), a fault inspection management device (120), and a design and manufacturing device (130) are interconnected via a network (150);

the communication device (140) transmits plant status information (dc) indicating the status of a plant or first plant alert information (da1) indicating an abnormality, a fault, or a danger of the plant, the plant status information (dc) and the first plant alert information (da1) being outputted from a plant control system (1) controlling the operation of the plant;

the diagnosis and monitoring device (110) stores the plant status information (dc) transmitted via the communication device (140), generates second plant alert information (da2) if it is determined that an abnormality or a sign of an abnormality is present in the plant by diagnosing the plant status information (dc) by means of a diagnosis program, further stores the first plant alert information (da1) transmitted via the communication device (140) and the second alert information (da2) generated, and transmits the first plant alert information (da1) and the second plant alert information (da2) to the fault inspection management device (120);

the fault inspection management device (120) takes in and stores latest plant apparatus configuration information (D1) from the design and manufacturing device (130), and stores and accumulates as fault inspection information (D2) the first plant alert information (da1) and the second plant alert information (da2) transmitted from the diagnosis and monitoring device (110) and a fault reason or an inspection reason indicated by third plant alert information (da3) inputted by a maintenance worker, in combination with apparatuses indicated by the plant apparatus configuration information (D1) and a fault/inspection cause; and the design and manufacturing device (130) stores plant apparatus configuration information (D1) indicating an apparatus configuration of the plant and fault probability of each apparatus, changes the fault probability of an apparatus which has failed or has been inspected of respective apparatuses constituting the plant on the basis of the fault inspection information (D2) taken in from the fault inspection management device (120), calculates the degree of safety from the fault inspection information (D2) taken in and the post-change fault probability of each apparatus, and updates the plant apparatus configuration information (D1) into latest information, if the degree of safety of a certain apparatus falls below a predetermined degree of safety, by repairing and restoring the apparatus of the plant apparatus configuration information (D1) or by replacing the apparatus with another apparatus having a high degree of safety.

A configuration of a plant safety design assistance device of the present invention is also characterized in that:

a communication device (140), a diagnosis and monitoring device (110), a fault inspection management device (120), a design and manufacturing device (130), and a requirement management device (160) are interconnected via a network (150);

the communication device (140) transmits plant status information (dc) indicating the status of a plant or first plant alert information (da1) indicating an abnormality, a fault, or a danger of the plant, the plant status information (dc) and the first plant alert information (da1) being outputted from a plant control system (1) controlling the operation of the plant;

the diagnosis and monitoring device (110) stores the plant status information (dc) transmitted via the communication device (140), generates second plant alert information (da2) if it is determined that an abnormality or a sign of an abnormality is present in the plant by diagnosing the plant status information (dc) by means of a diagnosis program, further stores the first plant alert information (da1) transmitted via the communication device (140) and the second alert information (da2) generated, and transmits the first plant alert information (da1) and the second plant alert information (da2) to the fault inspection management device (120);

the fault inspection management device (120) takes in and stores latest plant apparatus configuration information (D1) from the design and manufacturing device (130), and stores and accumulates as fault inspection information (D2) the first plant alert information (da1) and the second plant alert information (da2) transmitted from the diagnosis and monitoring device (110) and a fault reason or an inspection reason indicated by third plant alert information (da3) inputted by a maintenance worker, in combination with an apparatus indicated by the plant apparatus configuration information (D1) and a fault/inspection cause;

the design and manufacturing device (130) stores plant apparatus configuration information (D1) indicating an apparatus configuration of the plant, fault probability and specifications information (SP) of each apparatus, changes the fault probability of an apparatus which has failed or has been inspected of respective apparatuses constituting the plant on the basis of the fault inspection information (D2) taken in from the fault inspection management device (120), calculates the degree of safety from the fault inspection information (D2) taken in and the post-change fault probability of each apparatus, updates the plant apparatus configuration information (D1) into latest information, if the degree of safety of a certain apparatus falls below a predetermined degree of safety, by repairing and restoring the apparatus or by replacing the apparatus with another apparatus having a high degree of safety, registers the specifications information (SP) indicated by requirements specifications information (SP1) when the requirements specifications information (SP1) has been transmitted from the requirement management device (160) to the design and manufacturing device (130), and transmits specifications change information (SP2) to the requirement management device (160) when the specifications information (SP) has been changed; and the requirement management device (160) transmits the requirements specifications information (SP1) to the design and manufacturing device (130).

A configuration of a plant safety design assistance device of the present invention is also characterized in that:

a communication device (140), a diagnosis and monitoring device (110), a fault inspection management device (120), a design and manufacturing device (130), a requirement management device (160), and a customer support management device (170) are interconnected via a network (150);

the communication device (140) transmits plant status information (dc) indicating the status of a plant or first plant alert information (da1) indicating an abnormality, a fault, or a danger of the plant, the plant status information (dc) and the first plant alert information (da1) being outputted from a plant control system (1) controlling the operation of the plant;

the diagnosis and monitoring device (110) stores the plant status information (dc) transmitted via the communication device (140), generates second plant alert information (da2) if it is determined that an abnormality or a sign of an abnormality is present in the plant by diagnosing the plant status information (dc) by means of a diagnosis program, further stores the first plant alert information (da1) transmitted via the communication device (140) and the second alert information (da2) generated, and transmits the first plant alert information (da1) and the second plant alert information (da2) to the fault inspection management device (120);

the fault inspection management device (120) takes in and stores latest plant apparatus configuration information (D1) from the design and manufacturing device (130), and stores and accumulates as fault inspection information (D2) the first plant alert information (da1) and the second plant alert information (da2) transmitted from the diagnosis and monitoring device (110) and a fault reason or an inspection reason indicated by third plant alert information (da3) inputted by a maintenance worker, in combination with an apparatus indicated by the plant apparatus configuration information (D1) and a fault/inspection cause;

the design and manufacturing device (130) stores plant apparatus configuration information (D1) indicating an apparatus configuration of the plant, fault probability of each apparatus, and specifications information (SP), changes the fault probability of an apparatus which has failed or has been inspected of respective apparatuses constituting the plant on the basis of the fault inspection information (D2) taken in from the fault inspection management device (120), calculates the degree of safety from the fault inspection information (D2) taken in and the post-change fault probability of each apparatus, updates the plant apparatus configuration information (D1) into latest information, if the degree of safety of a certain apparatus falls below a predetermined degree of safety, by repairing and restoring the apparatus or by replacing the apparatus with another apparatus having a high degree of safety, registers the specifications information (SP) indicated by requirements specifications information (SP1) when the requirements specifications information (SP1) has been transmitted from the requirement management device (160) to the design and manufacturing device (130), transmits specifications change information (SP2) to the requirement management device (160) when the specifications information (SP) has been changed, further transmits product information (α) to the customer support device (170), and links defect information (β) to the plant apparatus configuration information (D1) and the specifications information (SP) when the defect information (β) has been transmitted from the customer support device (170) to the design and manufacturing device (130);

the customer support device (170) transmits a customer request item (β) to the requirement management device (160); and the requirement management device (160) transmits requirements specifications information (SP1) satisfying the customer request item (β) to the design and manufacturing device (130).

In addition, a configuration of a plant monitoring and maintenance assistance device of the present invention is characterized in that:

a communication device (240), a diagnosis and monitoring device (210), a fault inspection management device (220), and an instruction processing device (230) are interconnected via a network (250);

the communication device (240) transmits plant status information (dc) indicating the status of a plant or first plant alert information (da1) indicating an abnormality, a fault, or a danger of the plant, the plant status information (dc) and the first plant alert information (da1) being outputted from a plant control system (1) controlling the operation of the plant;

the diagnosis and monitoring device (210) stores the plant status information (dc) transmitted via the communication device (240), generates second plant alert information (da2) if it is determined that an abnormality or a sign of an abnormality is present in the plant by diagnosing the plant status information (dc) by means of a diagnosis program, further stores the first plant alert information (da1) transmitted via the communication device (240) and the second alert information (da2) generated, and transmits the first plant alert information (da1) and the second plant alert information (da2) to the fault inspection management device (220);

the fault inspection management device (220) stores plant apparatus configuration information (D1), stores and accumulates as fault inspection information (D2) the first plant alert information (da1) and the second plant alert information (da2) transmitted from the diagnosis and monitoring device (210) and a fault reason or an inspection reason indicated by third plant alert information (da3) inputted by a maintenance worker, in combination with an apparatus indicated by the plant apparatus configuration information (D1) and a fault/inspection cause, and further takes out information necessary for examination from the fault inspection information (D2) and transmits the information necessary for examination as examination instruction information (V) to the instruction processing device (230); and the instruction processing device (230) converts into a predetermined format the examination instruction information (V) transmitted and produces and outputs the examination instruction information (V) in the predetermined format as a written examination instruction (R3).

A configuration of a plant monitoring and maintenance assistance device of the present invention is also characterized in that:

a communication device (240), a diagnosis and monitoring device (210), a fault inspection management device (220), and a instruction processing device (230) are interconnected via a network (250);

the communication device (240) transmits plant status information (dc) indicating the status of a plant or first plant alert information (da1) indicating an abnormality, a fault, or a danger of the plant, the plant status information (dc) and the first plant alert information (da1) being outputted from a plant control system (1) controlling the operation of the plant;

the diagnosis and monitoring device (210) stores the plant status information (dc) transmitted via the communication device (240), generates second plant alert information (da2) if it is determined that an abnormality or a sign of an abnormality is present in the plant by diagnosing the plant status information (dc) by means of a diagnosis program, further stores the first plant alert information (da1) transmitted via the communication device (240) and the second alert information (da2) generated, and transmits the first plant alert information (da1) and the second plant alert information (da2) to the fault inspection management device (220);

the fault inspection management device (220) stores plant apparatus configuration information (D1), stores and accumulates as fault inspection information (D2) the first plant alert information (da1) and the second plant alert information (da2) transmitted from the diagnosis and monitoring device (210) and a fault reason or an inspection reason indicated by third plant alert information (da3) inputted by a maintenance worker, in combination with an apparatus indicated by the plant apparatus configuration information (D1) and a fault/inspection cause, and further takes out information necessary for examination from the fault inspection information (D2) and transmits the information necessary for examination as examination instruction information (V) to the instruction processing device (230); and the instruction processing device (230) converts into a predetermined format the examination instruction information (V) transmitted and produces and outputs the examination instruction information (V) in the predetermined format as a written examination instruction (R3), and performs information organization of an information format of the examination instruction information (V) into a format of the written examination instruction (R3) and wirelessly transmits the organized information as information of a written examination instruction Va to a portable terminal (260).

Advantageous Effects of Invention

According to the plant safety design assistance device of the present invention, plant monitoring and maintenance activities and plant design activities automatically coordinate with each other, so that it becomes easy for a designer and a monitoring/maintenance worker to exchange information.

In addition, a plant complying with functional safety standards (IEC61508 or ISO13849) or the like can keep the safety degree or the safety category even after the plant has been brought into practical operation.

In addition, according to the plant monitoring and maintenance assistance device of the present invention, even in the absence of an expert (designer/installer) who knows the details of the plant in the site of the plant, or even without an advanced analysis device, a maintenance worker can receive a precise examination instruction and deal with a problem.

In addition, by combining the past operation history of a plant to be monitored and with a periodic inspection result or repair information with each other, an expert or a maintenance worker can obtain chart information such as an examination result or repair of the plant/apparatus, and therefore can comprehensively judge past and present circumstances and determine how to deal with a problem.

As a result, an appropriate instruction/repair can be made. It becomes possible to quickly obtain necessary apparatus/replacement components. In addition, troubleshooting procedures are standardized, which leads to maintenance cost reduction.

BRIEF DESCRIPTION OF THE DRAWINGS

FIG. 5 is a configuration diagram showing a database part of the fault inspection management device;

FIG. 9 is a diagram showing a plant apparatus configuration information database of the design and manufacturing device;

FIG. 22 is a configuration diagram showing a database part of the fault inspection management device;

FIG. 26 is a functional configuration diagram showing a plant monitoring and maintenance assistance device according to Example 6 of the present invention.

DESCRIPTION OF EMBODIMENTS

Hereinafter, embodiments of the present invention will be described in detail on the basis of Examples.

EXAMPLE 1

<Plant Safety Design Assistance Device>

Figure 1:
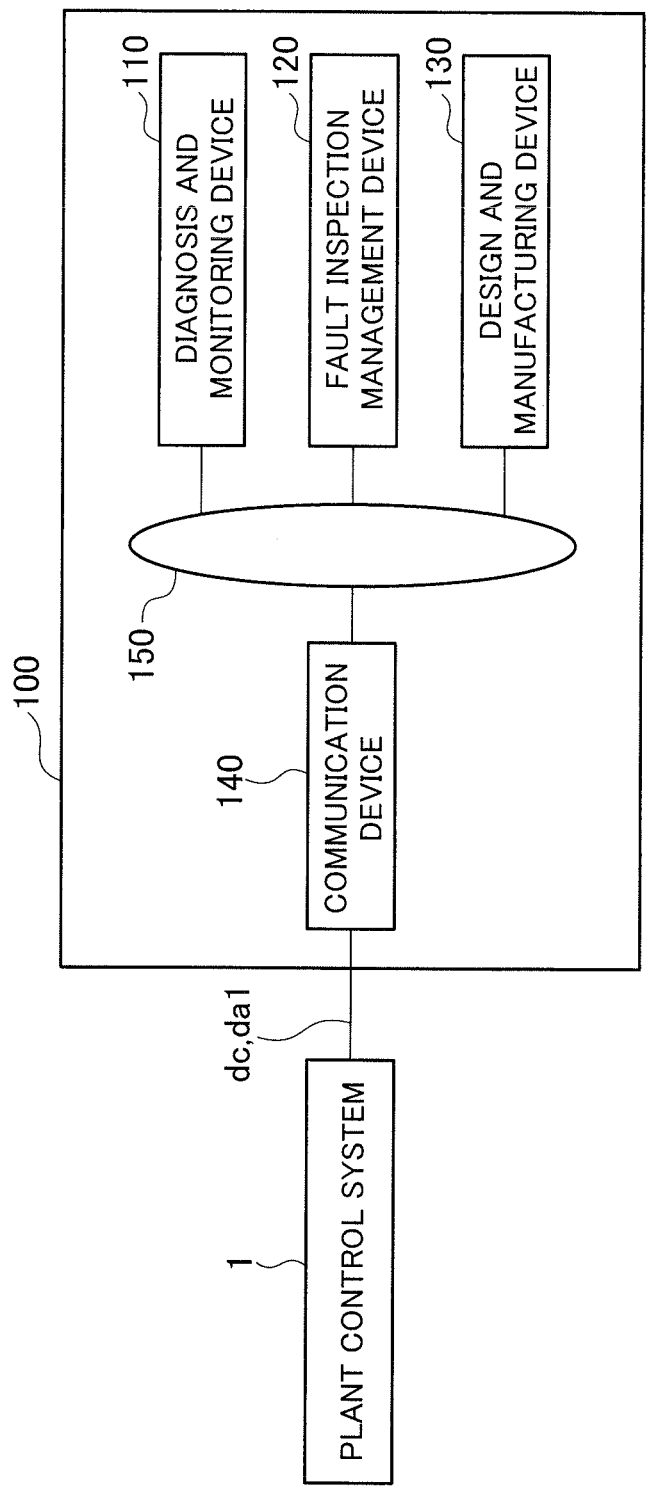
FIG. 1 is a block configuration diagram showing a plant safety design assistance device according to Example 1 of the present invention.

FIG. 1 is a block configuration diagram showing a plant safety design assistance device 100 according to Example 1 of the present invention.

This plant safety design assistance device 100 assists a plant (for example, a thermal power plant) in being capable of such a design (design change) as a plant circuit change or a component change such that the plant can keep its safety degree above a safety degree determined by an international functional safety standard or the like even after the plant starts practical operation.

This design assistance is performed in coordination with plant diagnosis and monitoring or fault inspection management.

<Summary of Entire Configuration>

First, with reference to FIG. 1, the entire configuration of the plant safety design assistance device 100 will be briefly described.

This plant safety design assistance device 100 is composed of a diagnosis and monitoring device 110, a fault inspection management device 120, a design and manufacturing device 130, a communication device 140, and a network 150.

The diagnosis and monitoring device 110 is a device diagnosing or monitoring the plant, the fault inspection management device 120 is a device maintaining fault inspection information on apparatuses used in the plant, and the design and manufacturing device 130 is a device maintaining design and manufacturing information on apparatuses used in the plant (plant apparatus configuration information or specifications information).

The communication device 140 is connected to a plant control system 1, and performs transmission and reception of data between the same and the plant control system 1.

The diagnosis and monitoring device 110, the fault inspection management device 120, the design and manufacturing device 130, and the communication device 140 are interconnected via the network 150 so that they can perform transmission and reception of data mutually.

The plant control system 1 controls the operation of a plant (for example, a thermal power plant), and outputs plant status information dc or plant alert information da1.

The plant alert information dc is a piece of information indicating a plant status, such as number of revolutions, temperature, flow rate, pressure, frequency of oscillation, voltage, or current of each apparatus constituting the plant.

The plant alert information da1 is data indicating an abnormality, a fault, or a danger of the plant, and can be information on abnormalities or the like obtained by sensors of various types provided in the plant, or can be information on abnormalities or the like determined on the basis of data of each sensor of the plant and outputted by the plant control system 1.

<Summary of Actions>

Figure 2:
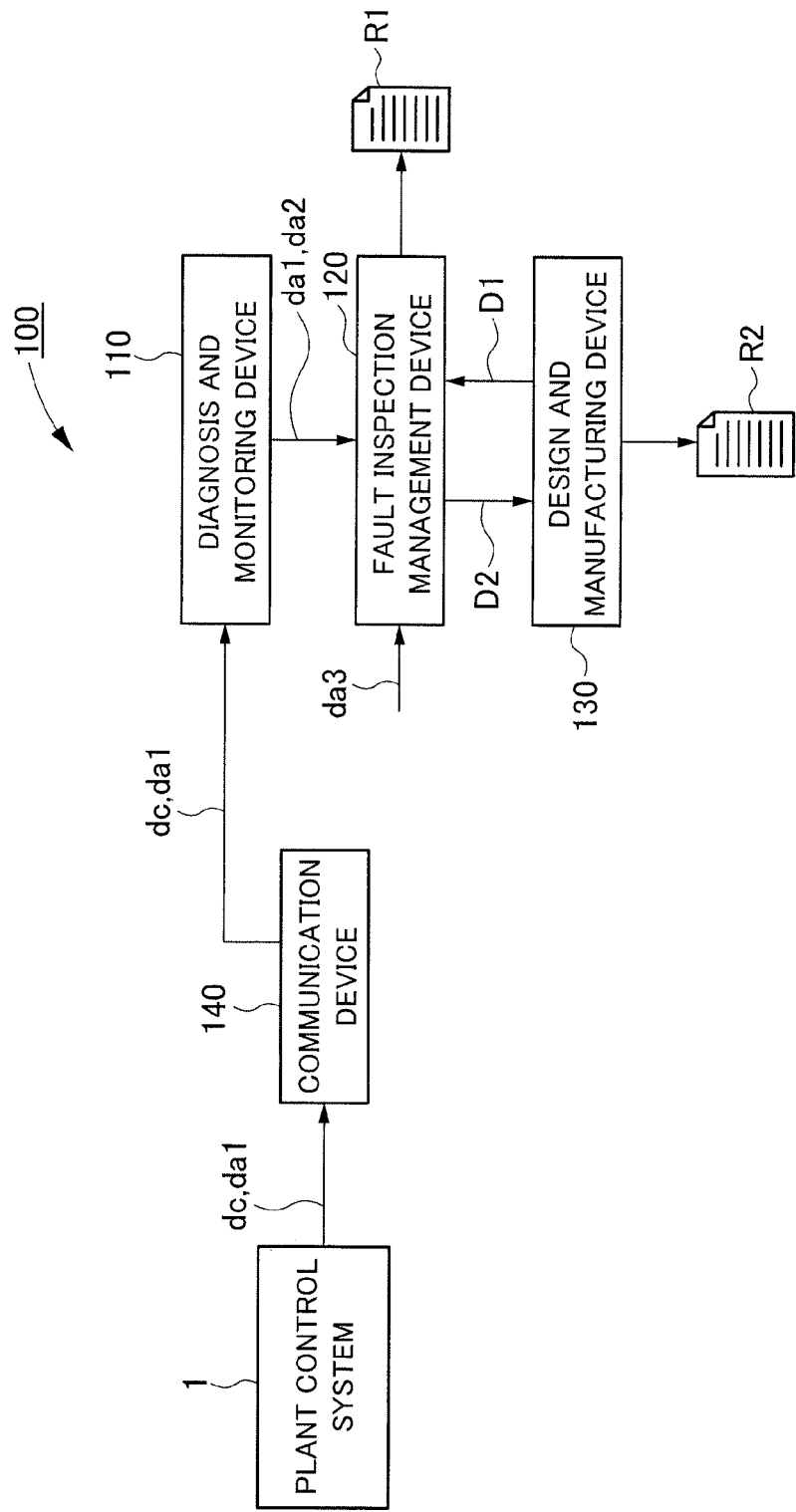
FIG. 2 is a functional configuration diagram showing the plant safety design assistance device according to Example 1 of the present invention.

Next, the summary of key actions in Example 1 will be described with reference to FIG. 1 and FIG. 2 that is a functional configuration diagram.

In Example 1, the diagnosis and monitoring device 110, the fault inspection management device 120, and the design and manufacturing device 130 exchange data from each other and operate in conjunction with each other, as well as operating individually. In particular, these devices are characterized by obtaining information from another device to operate in conjunction with each other.

The diagnosis and monitoring device 110 diagnoses the plant status information dc transmitted via the communication device 140 according to a diagnosis program, and performs diagnosis and monitoring of the plant. When it is determined that there is an abnormality as a result of the diagnosis, the diagnosis and monitoring device 110 generates plant alert information da2.

Then, the diagnosis and monitoring device 110 transmits the plant alert information da1 transmitted via the communication device 140 and the plant alert information da2 generated by itself to the fault inspection management device 120.

It should be noted that when a stochastic/inferential diagnosis is made by the diagnosis program, the diagnosis and monitoring device 110 takes in fault inspection information D2 stored in the fault inspection management device 120 and refers thereto at a diagnosis time.

The plant alert information da1, da2, or plant alert information da3 inputted by a maintenance worker are inputted into the fault inspection management device 120.

The fault inspection management device 120 takes in latest plant apparatus configuration information D1 indicating an apparatus configuration of the plant from the design and manufacturing device 130.

And, in the fault inspection management device 120, the reasons of faults/reasons of inspections indicated by the plant alert information da1, da2, da3 are stored in chronological order in correspondence with an apparatus indicated by the plant apparatus configuration information D1, the cause of fault/cause of inspection, or the like, and this is accumulated as fault inspection information D2.

The design and manufacturing device 130 stores the fault probability of each apparatus, as well as having the plant apparatus configuration information D1 indicating the apparatus configuration of the plant.

The design and manufacturing device 130 takes in the fault inspection information D2 from the fault inspection management device 120, and changes the fault probability of each apparatus which has failed or has been inspected. The fault probability thus changed and the fault inspection information D2 are utilized to calculate a factor of safety of each apparatus. If this factor of safety falls below a value determined by a safety standard, the information on the apparatuses of the plant apparatus configuration information D1 is updated to latest plant apparatus configuration information D1 so that the apparatus is replaced with another apparatus having a high factor of safety.

Thus, in Example 1, since the diagnosis and monitoring device 110 and the fault inspection management device 120 mutually exchange information, and further the fault inspection management device 120 and the design and manufacturing device 130 mutually exchange information, data obtained by diagnosis and monitoring or by fault inspection is brought into a design phase, and the plant apparatus configuration information in design and manufacture is updated, so that design assistance by which the plant design is conformed to the functional safety standard can be immediately/efficiently performed.

<Details of Configuration and Actions)

Next, the details of configuration/actions of the plant safety design assistance device 100 will be described with reference to FIG. 1 that is a block configuration diagram and FIG. 2 that is a functional configuration diagram.

The communication device 140 is used to make communication between the plant control system 1 and the respective devices 110, 120, 130 of the plant safety design assistance device 100. That is, the communication device 140 transmits the plant status information dc and the plant alert information da1 outputted from the plant control system 1, and introduces the information into the plant safety design assistance device 100.

As a communication medium of the communication device 140, a universal medium can be used, such as a public telephone line, the Internet, an exclusive line, or radio or satellite communication. A protocol can be Ethernet (registered trademark) or its own unique protocol. Therefore, the communication device 140 has a media converting function, gateway, and a router function.

The diagnosis and monitoring device 110 is a device receiving the plant status information dc and the plant alert information da1, and monitoring and diagnosing the plant.

The plant status information dc and the plant alert information da1 outputted from the plant control system 1 are inputted to the diagnosis and monitoring device 110 via the communication device 140 and the network 150.

The plant alert information da1 is stored in the diagnosis and monitoring device 110, and also transmitted to the fault inspection management device 120 via the diagnosis and monitoring device 110.

The diagnosis and monitoring device 110 diagnoses the plant status information dc by means of a diagnosis program, thereby determining the presence or absence of an abnormality or a sign of an abnormality of the plant, and generates the plant alert information da2 if it is determined that there is an abnormality or a sign of an abnormality. The diagnosis and monitoring device 110 stores the generated plant alert information da2, and also transmits the plant alert information da2 to the fault inspection management device 120.

Figure 3:
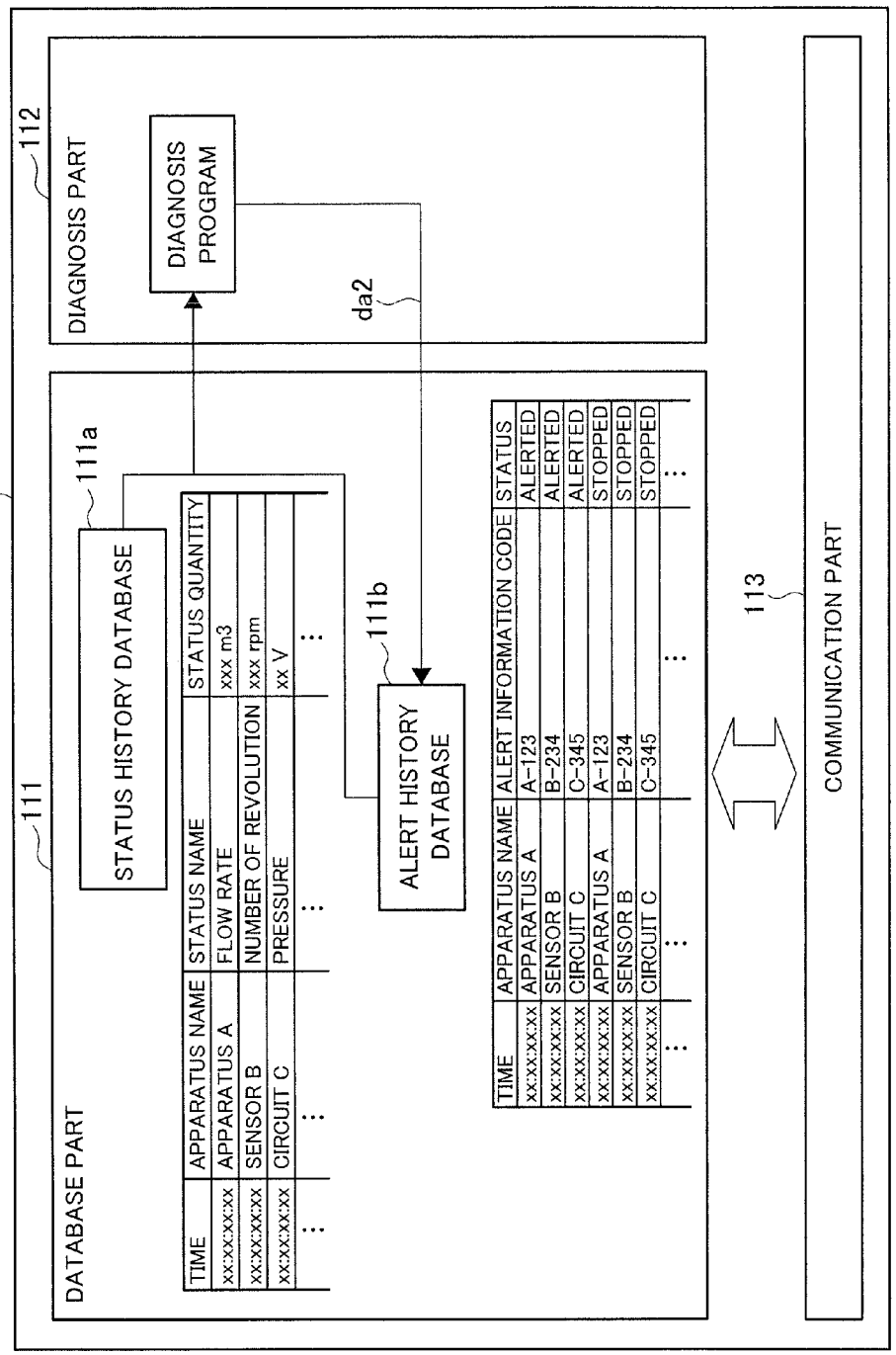
FIG. 3 is a configuration diagram showing a diagnosis and monitoring device used in Example 1.

In regard to the diagnosis and monitoring device 110, further, this diagnosis and monitoring device 110, as shown in FIG. 3, has a database part 111, a diagnosis part 112, and a communication part 113.

The database part 111 is composed of a status history database 111a and an alert history database 111b.

The plant status information dc outputted from the plant control system 1 and inputted via the communication device 140 and the network 150 is stored in the status history database 111a in chronological order. Primary keys are an apparatus name and a status name.

The plant alert information da1 outputted from the plant control system 1 and inputted via the communication device 140 and the network 150, and the plant alert information da2 generated according to the determination of the diagnosis part 112 that there is an abnormality or a sign of an abnormality in the plant are stored in the alert history database 111b in chronological order. Primary key is an apparatus name.

A diagnosis program is installed in the diagnosis part 112. The diagnosis part 112 diagnoses the inputted plant status information dc by means of the diagnosis program, thereby determining the presence or absence of an abnormality or a sign of an abnormality of the plant, and generates the plant alert information da2 if it is determined that there is an abnormality or a sign of an abnormality. This plant alert information da2 is stored in the alert history database 111b, and also transmitted to the fault inspection management device 120.

It should be noted that as the diagnosis program itself, a suitable diagnosis program can be installed according to the intended use. For example, as the diagnosis program, there are a program diagnosing a system load, a program diagnosing a combustion oscillation of a combustor, and the like.

As the diagnosis program installed in the diagnosis part 112, a program appropriate for an apparatus or for a plant configuration can be selected, such as a deterministic diagnosis program, or a stochastic/inferential diagnosis program.

It should be noted that in a case where the stochastic/inferential diagnosis program is used to make a stochastic/inferential diagnosis, the plant apparatus configuration information D1 and the fault inspection information D2 of the past stored in the fault inspection management device 120 are taken in, and a stochastic/inferential diagnosis is made with reference to the taken-in information.

The communication device 113 is composed of a communication program and a communication medium, and transmits the plant alert information da1, da2 stored in the alert history database 111b to the fault inspection management device 120.

The fault inspection management device 120 is a device maintaining the fault inspection information D2 of apparatuses used in the plant.

Figure 4:
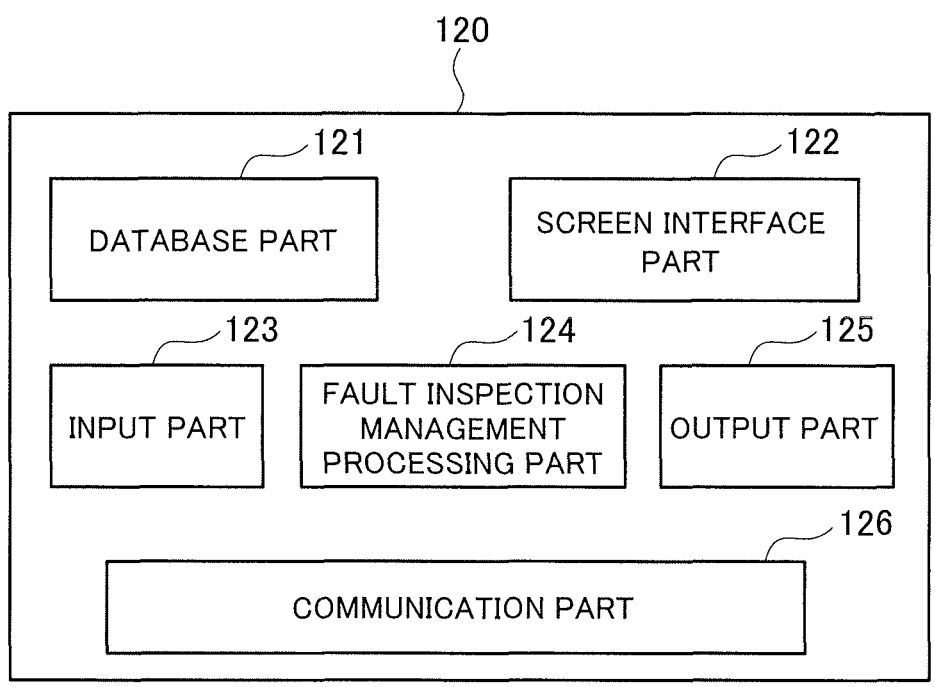
FIG. 4 is a configuration diagram showing a fault inspection management device used in Example 1.

This fault inspection management device 120, as shown in FIG. 4, has a database part 121, a screen interface part 122, an input part 123, a fault inspection management processing part 124, an output part 125, and a communication part 126.

The fault inspection management processing part 124 performs information arithmetic processing, information transmission processing, and the like, of the entire fault inspection management device 120.

For example, when defect information or the like found by a maintenance worker in a periodic inspection is inputted as the plant alert information da3 from the input part 123, this plant alert information da3 is transmitted to the database part 121.

The database part 121, as shown in FIG. 5, is composed of a plant apparatus configuration information database 121a, an alert information correspondence database 121b, and a fault inspection information database 121c.

The fault inspection management device 120 takes in the latest plant apparatus configuration information D1 held in the design and manufacturing device 130 via the communication part 126, copies/holds this latest plant apparatus configuration information D1, and builds the plant apparatus information database 121a.

The plant apparatus information database 121a holding the plant apparatus configuration information D1 holds an apparatus configuration database for each plant, and a component configuration database for each apparatus.

This does not only make it possible to identify which plant is composed of which apparatus, but also makes it possible to conduct a search to find which apparatus is used in which plant.

Further, since the plant apparatus information database 121a has the component configuration database for each apparatus, it is possible to search which component is used in which apparatus even at a component level of each apparatus.

For example, it is possible to conduct a crossover search to find which other apparatus (for example, a flowmeter, a pressure sensor, or the like) uses a capacitor of an arithmetic device board of a DCS (distributed control system). Similarly, it is possible to conduct a search to find which plant uses a certain solenoid valve.

The alert information correspondence database 121b is built by preliminarily registering/storing a possible cause/site to be inspected with respect to an alert defined in the plant, and a countermeasure against the cause.

It should be noted that defect information or the like found by a maintenance worker in a periodic inspection or the like is inputted as the plant alert information da3 from the input part 123, and a code registered in the alert information correspondence database 121b is used as an alert information code of this plant alert information da3.

The fault inspection information database 121c stores in chronological order as fault inspection reasons the alert information codes indicated by the plant alert information da1, da2 sent from the diagnosis and monitoring device 110 and the plant alert information da3 inputted from the input part 123. Besides, each alert information code (alert information or periodic inspection) holds a person in charge who dealt with the alert indicated by this alert information code, a cause code representing a fault/inspection cause, a countermeasure performed by solving the fault, and a result from this countermeasure.

That is, based on the plant alert information da1, da2 received from the diagnosis and monitoring device 110 and the plant alert information da3 inputted from the input part 123, the alert information correspondence database 121b is searched, and information is set in each of fields of fault inspection reasons, cause codes, and countermeasures.

In addition, the plant apparatus configuration information database 121a is searched from the plant alert information da1, da2, da3, and an apparatus ID of a target apparatus is set in an apparatus ID field. At this time, "before inspection" is registered in a result field.

Regarding date and time, a person in charge, and result, information inputted from the input part 123 by a person in charge who carried out an inspection/countermeasure is received and set.

The fault inspection information D2 organized/stored in the fault inspection information database 121c according to predetermined fault/abnormality classification shows a fault cause or a frequency for each apparatus constituting the plant or each component constituting each apparatus.

A fault cause clarified by the fault inspection information D2 is linked with the components database.

For example, regarding a fault that a switch constituting a solenoid valve neither opens nor closes due to sticking, a fault cause called "sticking" is linked with the switch of the solenoid valve. This makes it possible to accumulate data indicating by which component fault and how often the solenoid valve fault is caused.

To sum up, the fault inspection information D2 stored in the fault inspection information database 121c is information in which:

The fault reasons indicated by the plant alert information da1, da2, and the inspection reason/fault reason of a periodic inspection or a response corresponding to the plant alert information da3 are chronologically held;

and in which:

Besides, in which an apparatus (component) of the respective apparatuses (respective components) indicated in the latest plant apparatus configuration information D1 taken in from the design and manufacturing device 130 each fault reason/inspection reason occurred;

What the cause of each fault reason/inspection reason was; and

Which person in charge took what kind of counter measure against each fault reason/inspection reason, and what the result of the countermeasure was are accumulated.

In addition, the fault inspection management processing part 124 calculates MTBF (Mean Time Between Failure) and MTTR (Mean Time To Repair) information, based on the fault inspection information D2, and the calculation result is held in the database part 121.

The communication part 126 is composed of a communication program and a communication medium, and sends the fault inspection information D2 stored in the fault inspection information database 121c to the design and manufacturing device 130.

The screen interface part 122 provides a diagram or a table necessary for a person who issues an instruction for inspection to determine whether or not a written inspection instruction needs to be produced.

For example, the status history database 111a maintained by the diagnosis and monitoring device 110 is accessed, and a trend graph is produced.

Alternatively, a histogram of the number of alerts issued for each apparatus constituting the plant is produced from the fault inspection information database 121c, the frequency of abnormalities is provided, or a histogram of each abnormality cause expected in a specific apparatus is provided.

This makes it possible for a person who issues an instruction for inspection to determine whether or not a written inspection instruction needs to be produced, and indicate a specific site to be inspected if the necessity of inspection is determined.

A display software can be a web browser or an exclusive display software.

Figure 6:
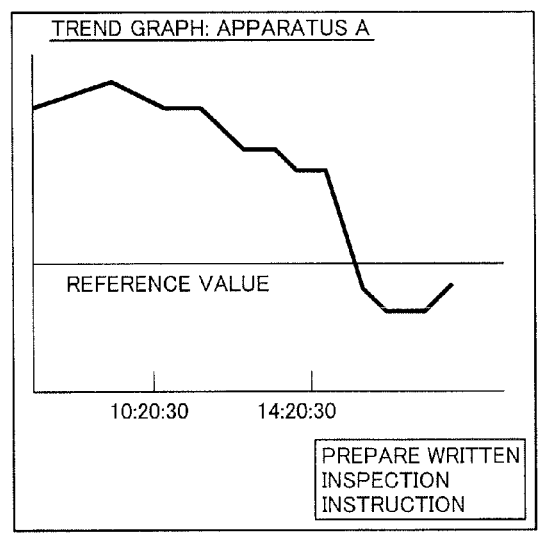
FIG. 6 is a diagram showing an example of display on a screen interface part of the fault inspection management device.
Figure 7:
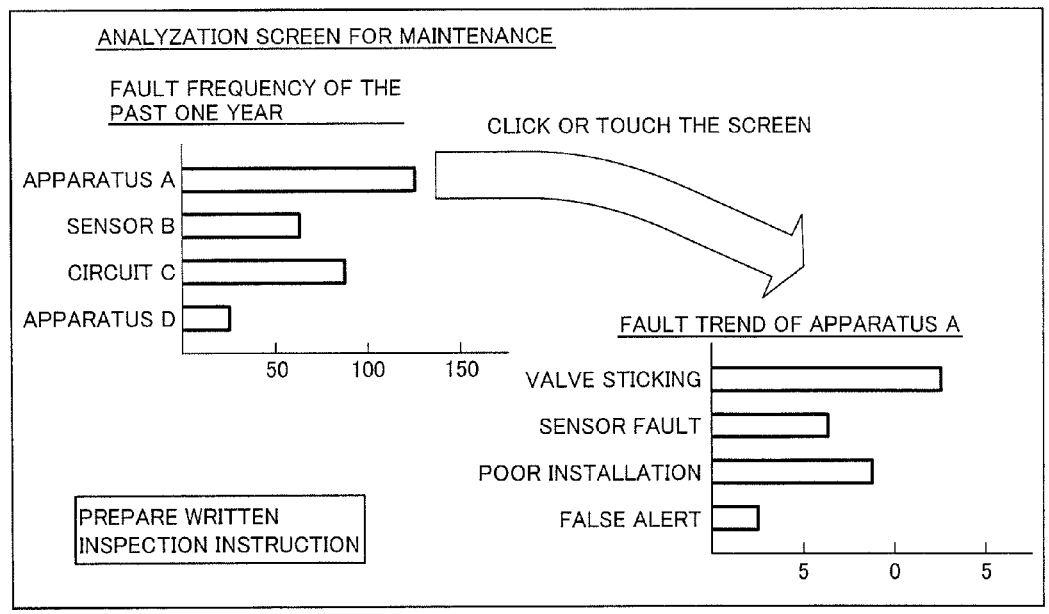
FIG. 7 is a diagram showing an example of display on a screen interface part of the fault inspection management device.

FIG. 6 and FIG. 7 show display examples displayed on the screen interface part 122 of the fault inspection management device 120.

It should be noted that the status history database 111a also stores each status quantity required and its reference value (abnormality determination value) paired therewith. In the case of a parameter whose reference value is determined by some status quantities (for example, in a case where any two of a pressure, a temperature, and a volume determine a reference value of the remaining one in a state equation PV=nRT), a reference value obtained by the diagnosis program is displayed.

When a "PREPARE WRITTEN INSPECTION INSTRUCTION" button is pressed, a document of information on an apparatus to be inspected, an item to be inspected, a countermeasure, the number of similar alerts of the past, and the content of a countermeasure performed for each alert of the past is outputted from the output part 125 as a written inspection instruction R1 in a predetermined form.

The design and manufacturing device 130 is a device maintaining design and manufacturing information on apparatuses used in the plant (the plant apparatus configuration information D1, specifications information SP, and the like).

Figure 8:
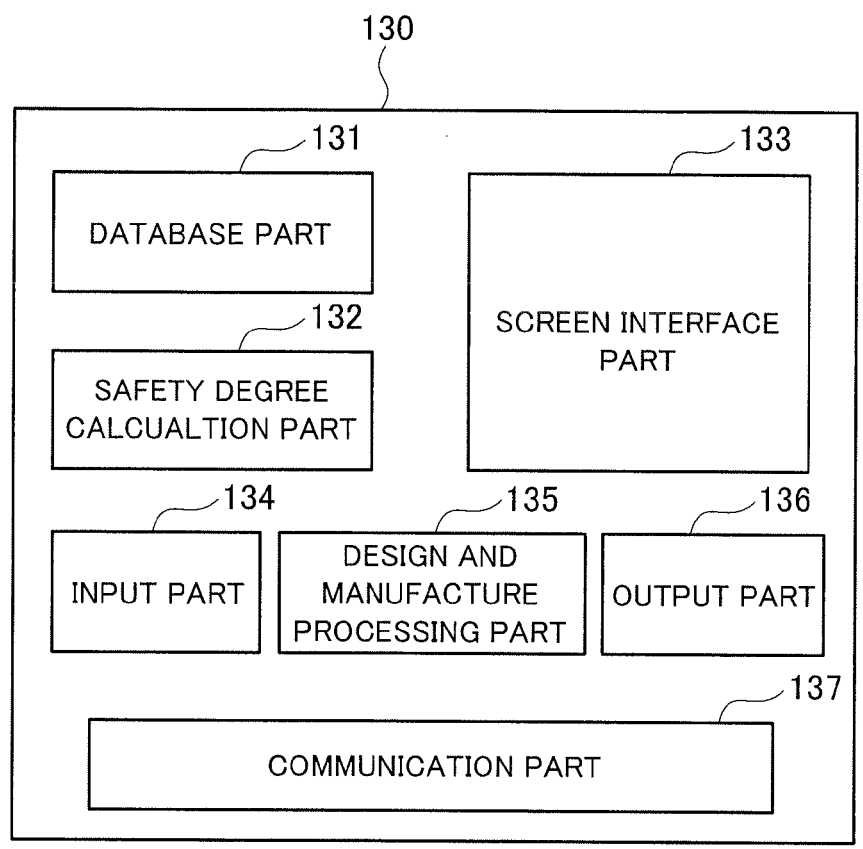
FIG. 8 is a configuration diagram showing a design and manufacturing device used in Example 1.

This design and manufacturing device 130, as shown in FIG. 8, has a database part 131, a safety degree calculation part 132, a screen interface 133, an input part 134, a design and manufacture processing part 135, an output part 136, and a communication part 137.

The design and manufacturing device 135 performs information arithmetic processing, information transmission processing, and the like, of the entire design and manufacturing device 130.

Figure 10:
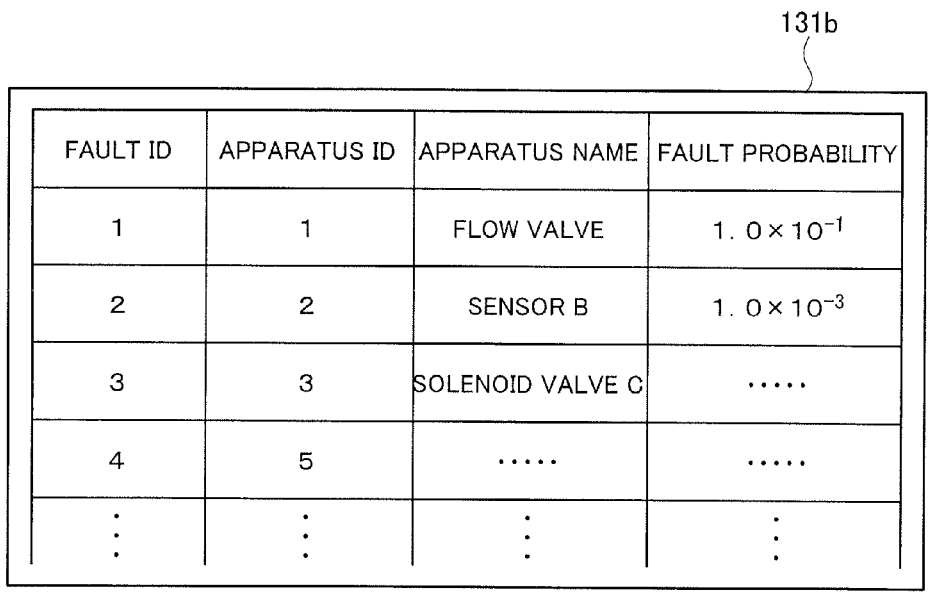
FIG. 10 is a diagram showing an apparatus fault probability database of the design and manufacturing device.
Figure 11:
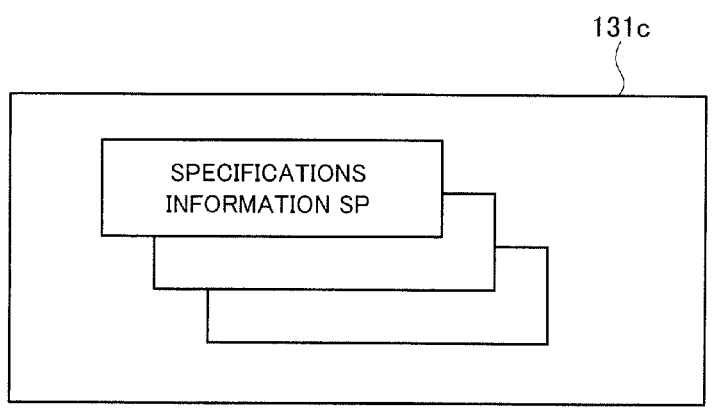
FIG. 11 is a diagram showing a specifications information database of the design and manufacturing device.

Design and manufacturing information on apparatuses used in the plant, such as plant apparatus configuration information database 131a as shown in FIG. 9, an apparatus fault probability database 131b as shown in FIG. 10, or a specifications information database 131c as shown in FIG. 11, is stored in the database part 131.

That is, the database part 131 of the design and manufacturing device 130 holds data holding a design drawing, a components list, a replacement component/apparatus list of apparatuses, piping, an electrical wiring system, or the like, in each plant, and a safety degree level, a periodic examination interval, and a manufacture lot number set in the plant or the apparatuses.

The plant apparatus configuration information D1 indicating a hardware configuration and a software configuration of the plant is stored as BOM (Bills Of Materials) in the plant apparatus configuration information database 131a, as shown in FIG. 9. FIG. 9 shows an example of the BOM configuration.

The BOM holds hardware configuration information and software configuration information. The hardware information holds ranges from the level of a minimum component to the level of its replacement. The software information holds ranges from an executable file to its source file compiler in combination with a version.

Originals of these software configuration components are held in a hard disk (not shown) of this device.

It should be noted that when the plant control system 1 shown in FIG. 1 holds the plant apparatus configuration information, the design and manufacturing device 130 has a function of acquiring the apparatus configuration information held by the plant control system 1 via the communication device 140, and performing comparison and collation of the apparatus configuration information with the BOM held by the plant apparatus configuration information database 131a so that it can be confirmed that the BOM data matches with the plant apparatus configuration, and can also have a function of transmitting alert information to the fault inspection management device 120 if a mismatch there between is detected.

Fault IDs, apparatus IDs, apparatus names (components), and fault probabilities are stored in the apparatus fault probability database 131b, as shown in FIG. 10.

The fault probability is inputted from the input part 134 for each apparatus (component) at the start.

After the start of practical operation, the fault inspection information D2 is taken in from the fault inspection management device 120 via the communication device 137, the fault probability of an apparatus which has failed or has been inspected of the respective apparatuses constituting the plant is calculated by the design and manufacture processing part 135 based on the taken-in fault inspection information D2, and the value of the fault probability of each apparatus (component) is changed based on the calculation result.

The specifications information SP is stored in the specifications information database 11, as shown in FIG. 11.

The safety degree calculation part 132 calculates a safety degree according to a predetermined calculation formula (for example, a calculation formula based on IEC61508 standard part 6 Annex B) from the hardware configuration information (plant apparatus configuration information) stored in the BOM of the plant apparatus configuration information database 131a, the fault probability data for each piece of apparatus/component stored in the apparatus fault probability database 131b, and the MTBF (Mean Time Between Failure) and MTTR (Mean Time To Repair) information held by the fault inspection management device 120.

When the safety degree of a specific piece of apparatus/component contained in the plant apparatus configuration information D1 stored in the plant apparatus configuration information database 131a has fallen below a predetermined safety degree, the design and manufacture processing part 135 carries out restoration by repair performed such that the specific apparatus/component fulfills an equivalent function and satisfies the safety degree, or replacement with another apparatus/component fulfilling an equivalent function and having a high safety degree, according to an updating command inputted by a designer via the input part 134, and, in particular, when the specific apparatus/component has been replaced, the design and manufacture processing part 135 updates (changes) the apparatus/component in the plant apparatus configuration information D1 into a new apparatus/component as new updated (changed) plant apparatus configuration information D1.

The latest plant apparatus configuration information D1 thus updated complies with an international functional safety standard or the like.

Further, when there is any change in an apparatus or a component, the design and manufacture processing part 135 can specify which plant/apparatus is affected by the change by means of a retrieval function.

The screen interface part 133 displays a graph or a table of information necessary for safety design, such as a trend graph of the safety degree or a component fault frequency.

Figure 12:
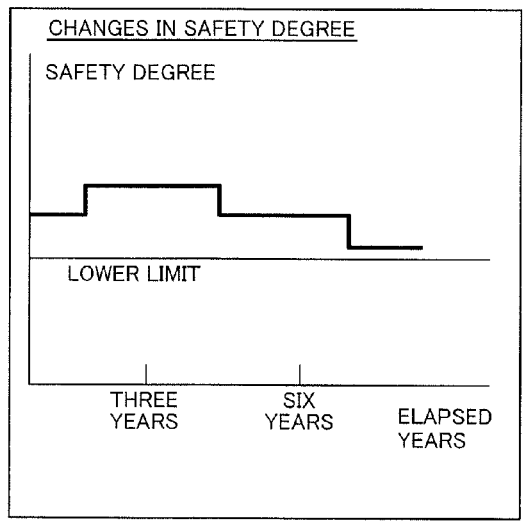
FIG. 12 is a diagram showing an example of display on a screen interface part of the design and manufacturing device.
Figure 13:
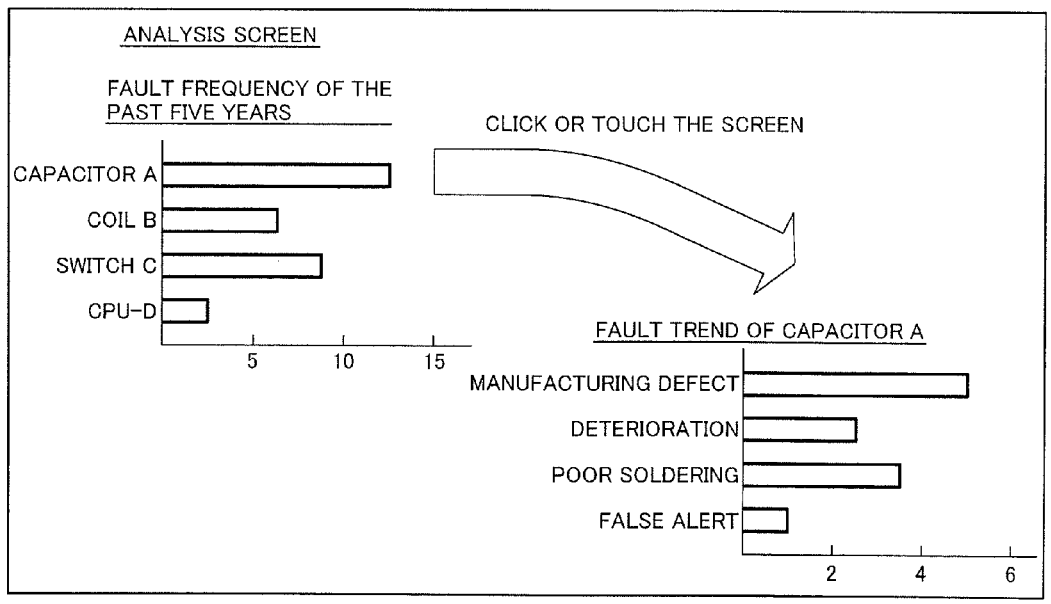
FIG. 13 is a diagram showing an example of display on a screen interface part of the design and manufacturing device.

FIG. 12 and FIG. 13 show display examples displayed on the screen interface part 123.

Further, the design and manufacture processing part 135 takes out data necessary for a third-party audit such as a functional safety certification body from the plant apparatus configuration information database 131a, the apparatus fault probability database 131b, and the specifications database 131c, and outputs from the output part 136 a document of the data in a predetermined form as a system safety audit report R2.

EXAMPLE 2

Figure 14:
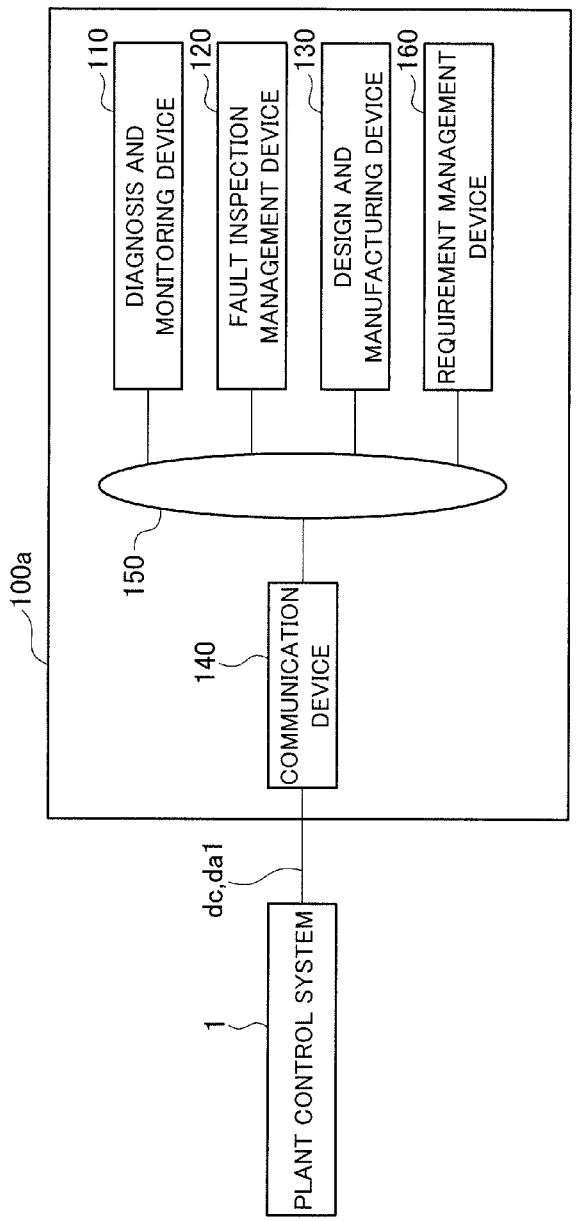
FIG. 14 is a block configuration diagram showing a plant safety design assistance device according to Example 2 of the present invention.
Figure 15:
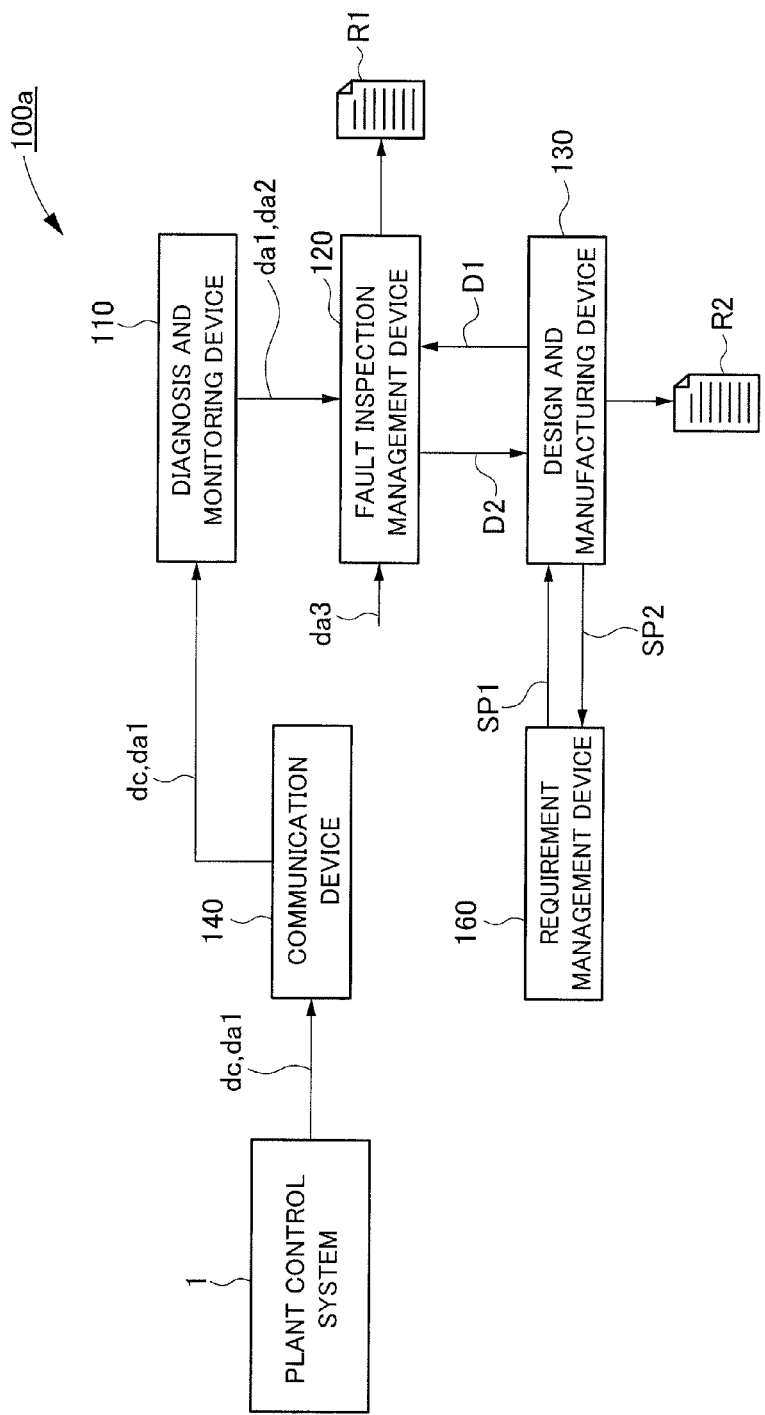
FIG. 15 is a functional configuration diagram showing the plant safety design assistance device according to Example 2 of the present invention.

Next, a plant safety design assistance device 100a according to Example 2 of the present invention will be described with reference to FIG. 14 that is a block configuration diagram and FIG. 15 that is a functional configuration diagram.

This plant safety design assistance device 100*a* is such that a requirement management device 160 is added to the plant safety design assistance device 100 of Example 1, and a new function is also added to the design and manufacturing device 130.

And, the diagnosis and monitoring device 110, the fault inspection management device 120, the design and manufacturing device 130, the communication device 140, and the requirement management device 160 are interconnected via the network 150 to be capable of performing transmission and reception of data mutually.

The requirement management device 160 has a requirement management database, and manages requirement items managed in a requirement item establishing phase that is an upstream process of design.

When requirements specifications information SP1 is transmitted from the requirement management device 160 to the design and manufacturing device 130, specifications information indicated by the requirements specifications information SP1 is registered in the specifications information database 131*c* contained in the database part 131 of the design and manufacturing device 130.

In addition, in the design and manufacturing device 130, when the specifications information SP registered in the specifications information database 131*c* contained in the database part 131 has been changed, specifications change information SP2 indicating how the specifications information SP has been changed is transmitted from the design and manufacturing device 130 to the requirement management device 160.

Since the plant safety design assistance device 100*a* is thus configured, when a requirements specification is added, a person who manages requirements specifications (a person in charge of planning a product, a customer, or an auditor of a third party such as a functional safety certification body) can track design contents and component (software) information realizing the requirements specifications, and a plant to which the requirements specifications have been applied.

In addition, when a component change has occurred in a design/manufacture process, a person in charge of design/manufacture can refer to, as a criterion, whether or not the design change/component change is within a range in which the requirements specifications are satisfied.

These functions make it possible for a person who manages requirements specifications to confirm that a product which has certainly satisfied the requirements specifications is shipped.

EXAMPLE 3

Figure 16:
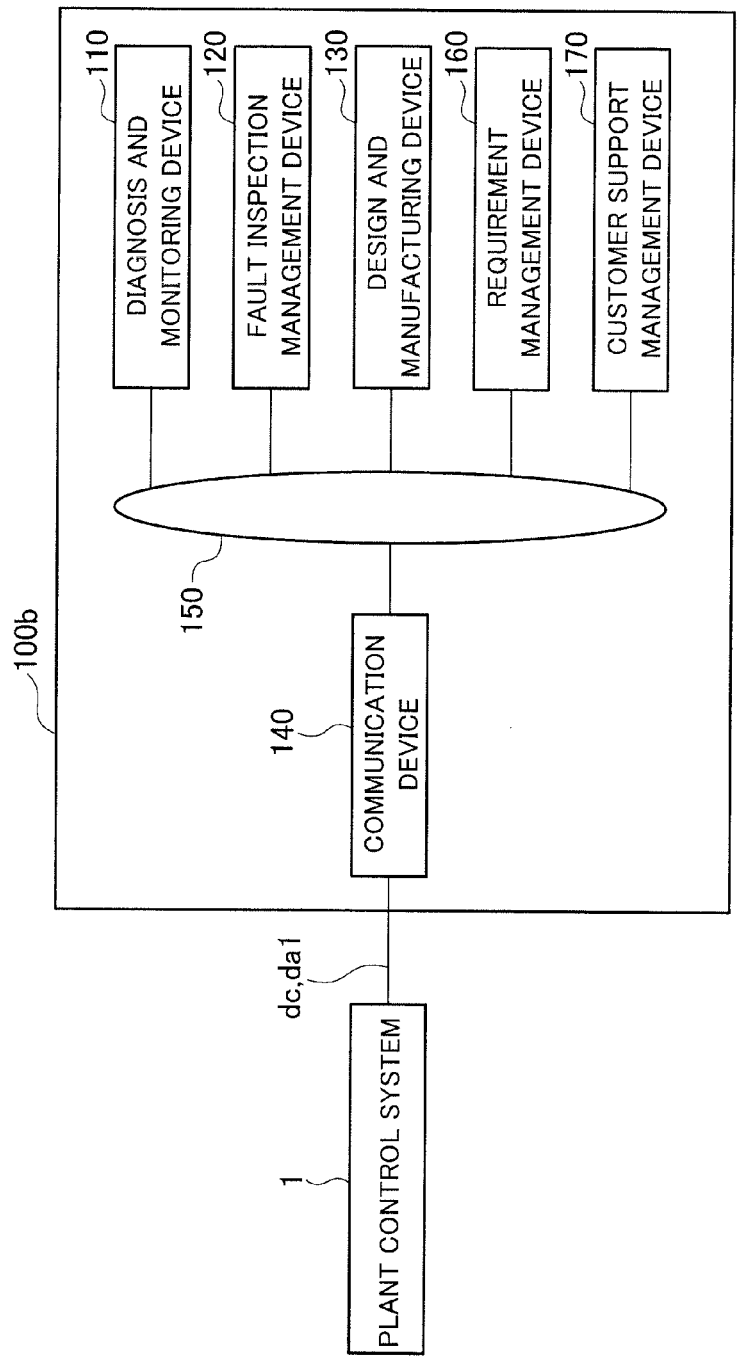
FIG. 16 is a block configuration diagram showing a plant safety design assistance device according to Example 3 of the present invention.
Figure 17:
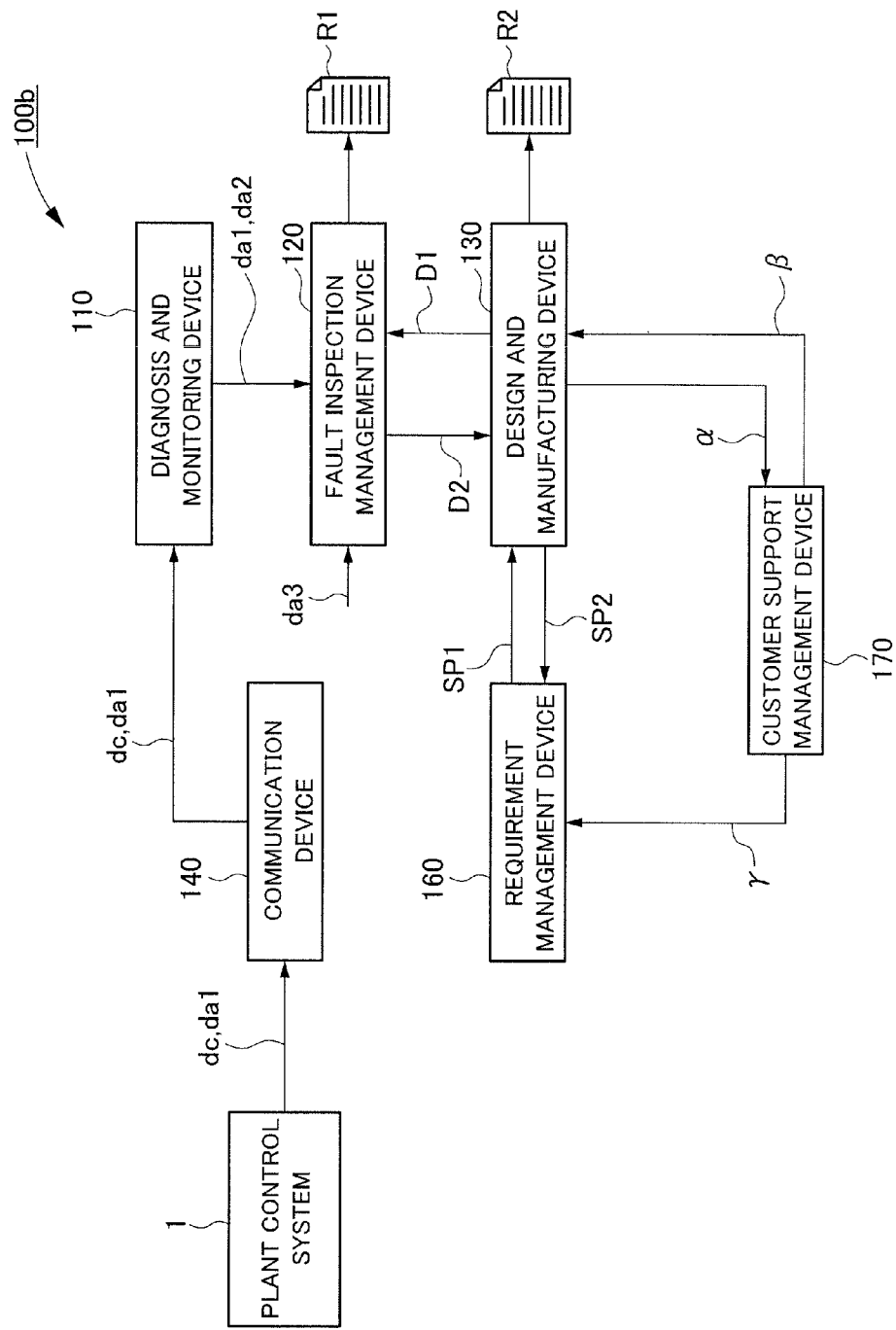
FIG. 17 is a functional configuration diagram showing the plant safety design assistance device according to Example 3 of the present invention.

Next, a plant safety design assistance device 100*b* according to Example 3 of the present invention will be described with reference to FIG. 16 that is a block configuration diagram and FIG. 17 that is a functional configuration diagram.

This plant safety design assistance device 100*b* is such that a customer support management device 170 is further added to the plant safety design assistance device 100*a* of Example 2, and new functions are added to the design and manufacturing device 130 and the requirement management device 160.

And, the diagnosis and monitoring device 110, the fault inspection management device 120, the design and manufacturing device 130, the communication device 140, the requirement management device 160, and the customer support management device 170 are interconnected via the network 150 to be capable to performing transmission and reception of data mutually.

The customer support management device 170 is required in an after-sales service phase.

In some cases, a customer (plant user) informs the plant manufacturer of an opinion based on the operation or defect information (for example, a starting procedure of a certain device is mistakable, abnormal noises are heard, or the like). These defect information include information useful for quality improvement of the plant design and near-misses due to an unintended method of using the product.

Such information as a customer directly informs the manufacturer of is held in a customer support database of the customer support management device 170, and respective contents of the information are linked to the requirements specifications held by the requirements specifications management device 160 or a components list held by the design and manufacturing management device 130.

Specifically, product information α is transmitted from the design and manufacturing device 130 to the customer support management device 170.

On the other hand, defect information P is transmitted from the customer support management device 170 to the design and manufacturing device 130. Then, the design and manufacturing device 130 links the defect information F to the apparatus/component of the plant apparatus configuration information D1 or the specifications information SP. Further, the design and manufacturing device 130 can change the plant apparatus configuration information D1 or the specifications information SP in order to solve the defect indicated by the defect information R.

When a customer request item y is transmitted from the customer support management device 170 to the requirement management device 160, the requirement management device 160 transmits the requirements specifications information SP1 satisfying the customer request item y to the design and manufacturing device 130.

This makes it possible for the requirement manager (product planning section) or the designer to revise the specifications or change the design, using the defect information or the request item from a customer as action items, thereby contributing to quality improvement.

EXAMPLE 4

<Plant Monitoring and Maintenance Assistance Device>

Figure 18:
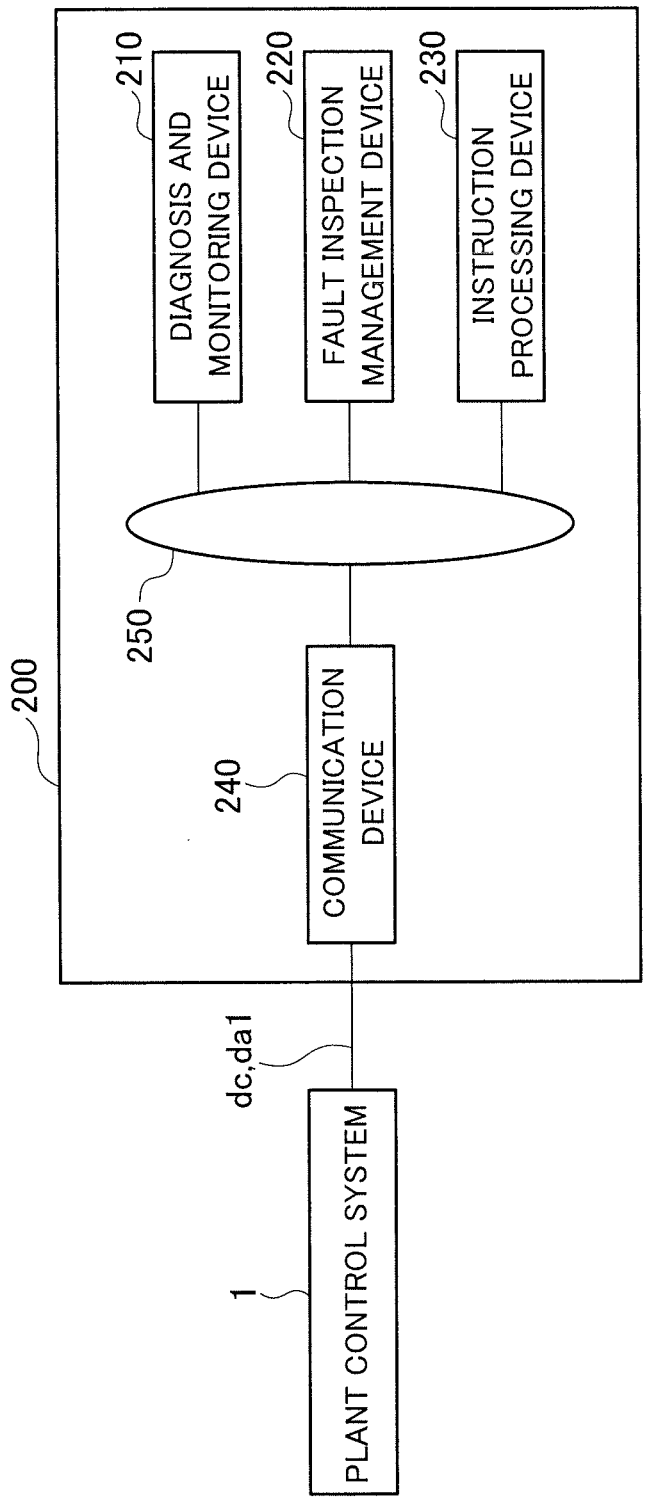
FIG. 18 is a block configuration diagram showing a plant monitoring and maintenance assistance device according to Example 4 of the present invention.

FIG. 18 is a block configuration diagram showing the plant monitoring and maintenance assistance device 200 according to Example 4 of the present invention.

This plant monitoring and maintenance assistance device 200 assists providing past inspection history of the plant and the defect information relating thereto, and further a past treatments list to an operator or a maintenance worker of a plant (for example, a thermal power plant), after the plant starts practical operation.

This plant monitoring and maintenance assistance device 200 makes it possible for an operator or a maintenance worker of the plant to immediately grasp the plant status of the past and the treatment taken in the past, and immediately make a countermeasure plan or obtain a necessary apparatus, so that it is possible to restore the plant to a normal status quickly.

This monitoring and maintenance assistance is performed in conjunction with diagnosis and monitoring or fault inspection management of the plant.

<Summary of Entire Configuration>

First, with reference to FIG. 18, and entire configuration of the plant monitoring and maintenance assistance device 200 will be briefly described.

This plant monitoring and maintenance assistance device 200 is composed of a diagnosis and monitoring device 210, a fault inspection management device 220, an instruction processing device 230, a communication device 240, and a network 250.

The diagnosis and monitoring device 210 is a device monitoring and diagnosing a plant, the fault inspection management device 220 is a device maintaining fault inspection information on apparatuses used in the plant, and the instruction processing device 230 is a device issuing an examination instruction to an operator/worker.

The communication device 240 is connected to a plant control system 1 to perform transmission and reception of data between the same and the plant control system 1.

The diagnosis and monitoring device 210, the fault inspection management device 220, the instruction processing device 230, and the communication device 240 are interconnected via the network 250 to be capable of perform transmission and reception of data mutually.

The plant control system 1 controls the operation of a plant (for example, a thermal power plant), and outputs plant status information dc or plant alert information da1.

The plant status information dc is information indicating a plant status, such as number of revolutions, temperature, flow rate, pressure, frequency of oscillation, voltage, or current of each apparatus constituting the plant.

The plant alert information da1 is data indicating an abnormality, a fault, or a danger of the plant, and can be information on abnormalities or the like obtained by sensors of various types provided in the plant, or can be information on abnormalities or the like determined on the basis of data of each sensor of the plant and outputted by the plant control system 1.

<Summary of Actions>

Figure 19:
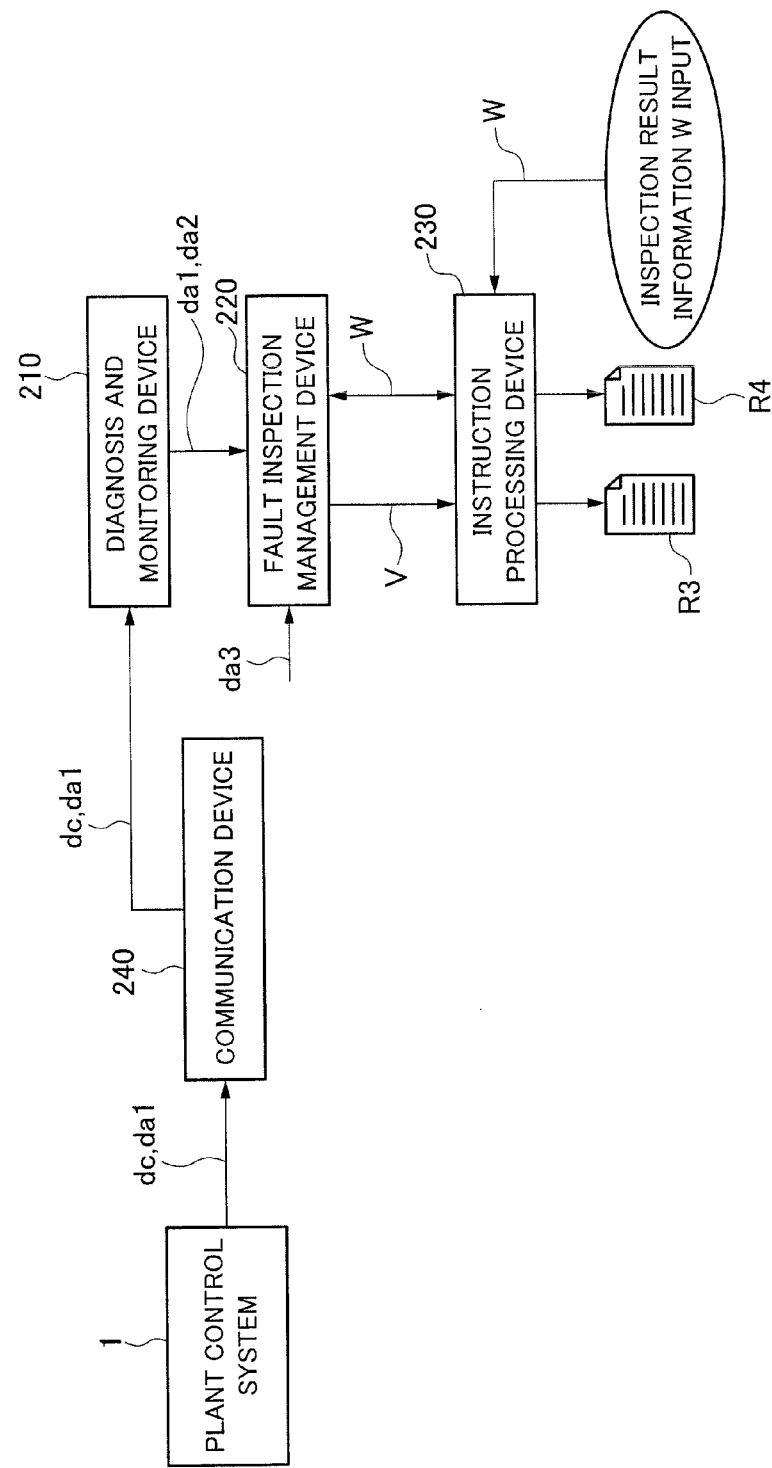
FIG. 19 is a functional configuration diagram showing the plant monitoring and maintenance assistance device according to Example 4 of the present invention.

Next, the summary of key actions in Example 4 will be described with reference to FIG. 18 and FIG. 19 that is a functional configuration diagram.

In Example 4, the diagnosis and monitoring device 210, the fault inspection management device 220, and the instruction processing device 230 obtain data from another device mutually and operate in conjunction with each other, as well as operating individually. In particular, these devices are characterized by obtaining information from another device to operate in conjunction with each other.

The diagnosis and monitoring device 210 diagnoses the plant status information dc transmitted via the communication device 240 according to a diagnosis program, and performs diagnosis and monitoring of the plant. When it is determined that there is an abnormality as a result of the diagnosis, the diagnosis and monitoring device 210 generates plant alert information da2.

Then, the diagnosis and monitoring device 210 transmits the plant alert information da1 transmitted via the communication device 240 and the plant alert information da2 generated by itself to the fault inspection management device 220.

It should be noted that when a stochastic/inferential diagnosis is made by the diagnosis program, the diagnosis and monitoring device 210 takes in fault inspection information D2 stored in the fault inspection management device 220 and refers thereto at a diagnosis time.

The plant alert information da1, da2, or plant alert information da3 inputted by a maintenance worker are inputted into the fault inspection management device 220.

Plant apparatus configuration information D1 indicating an apparatus configuration of the plant is stored in this fault inspection management device 220.

And, in the fault inspection management device 220, the reasons of faults/reasons of inspections indicated by the plant alert information da1, da2, da3 are stored in chronological order in correspondence with an apparatus indicated by the plant apparatus configuration information D1, the cause of fault/cause of inspection, or the like, and this is accumulated as fault inspection information D2.

Further, the fault inspection management device 220 takes out past periodic examination result information, a past treatments list, or the like, which is necessary for examining the plant, from the fault inspection information D2 as examination instruction information V, and this examination instruction information V is transmitted to the instruction processing device 230.

When the instruction processing device 230 receives the examination instruction information V transmitted from the fault inspection management device 220, it then converts the examination instruction information V into a predetermined format and produces and outputs the same as a written examination instruction R3.

This written examination instruction R3 shows a necessary examination instruction taking into account the past periodic examination result information, the past treatments list, or the like.

Examination result information W indicating the result of an examination performed by an operator/maintenance worker according to the written examination instruction R3 is inputted to the instruction processing device 230, and transmitted from the instruction processing device 230 to the fault inspection management device 220 and stored therein.

The examination result information W stored in the fault inspection management device 220 is transmitted again to the instruction processing device 230. The instruction processing device 230 converts the examination result information W transmitted from the fault inspection management device 200 into a predetermined format, and produces and outputs the same as an examination result report R4.

Thus, in Example 4, since the diagnosis and monitoring device 210 and the fault inspection management device 220 mutually exchange information, and further the fault inspection management device 220 and the instruction processing device 230 mutually exchange information, it is possible to provide past inspection history of the plant or defect information relating thereto, and further a past treatments list to a plant operator or maintenance worker, so that the operator or maintenance worker can unerringly carry out a necessary inspection.

<Details of Configuration and Actions>

Next, the details of configuration/actions of the plant monitoring and maintenance assistance device 200 will be described with reference to FIG. 18 that is a block configuration diagram and FIG. 19 that is a functional configuration diagram.

The communication device 240 is used to make communication between the plant control system 1 and the respective devices 210, 220, 230 of the plant monitoring and maintenance assistance device 200. That is, the communication device 240 transmits the plant status information dc and the plant alert information da1 outputted from the plant control system 1, and introduces the information into the plant monitoring and maintenance assistance device 200.

As a communication medium of the communication device 240, a universal medium can be used, such as a public telephone line, the Internet, an exclusive line, or radio or satellite communication. A protocol can be Ethernet or its own unique protocol. Therefore, the communication device 240 has a media converting function, gateway, and a router function.

The diagnosis and monitoring device 210 is a device receiving the plant status information dc and the plant alert information da1, and monitoring and diagnosing the plant.

The plant status information dc and the plant alert information da1 outputted from the plant control system 1 are inputted to the diagnosis and monitoring device 210 via the communication device 240 and the network 250.

The plant alert information da1 is stored in the diagnosis and monitoring device 210, and also transmitted to the fault inspection management device 220 via the diagnosis and monitoring device 210.

The diagnosis and monitoring device 210 diagnoses the plant status information dc by means of a diagnosis program, thereby determining the presence or absence of an abnormality or a sign of an abnormality of the plant, and generates the plant alert information da2 if it is determined that there is an abnormality or a sign of an abnormality. The diagnosis and monitoring device 210 stores the generated plant alert information da2, and also transmits the plant alert information da2 to the fault inspection management device 220.

Figure 20:
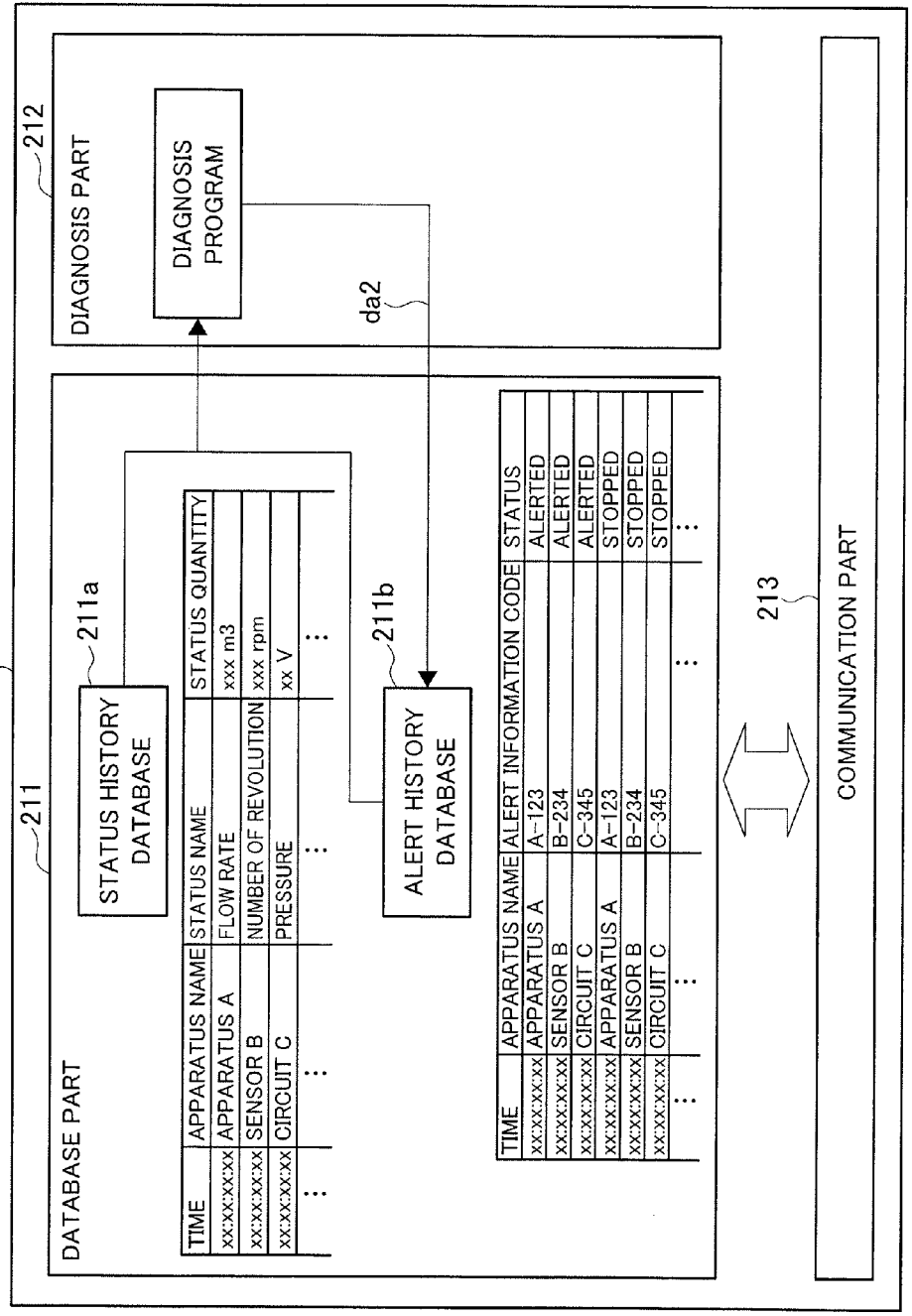
FIG. 20 is a configuration diagram showing a diagnosis and monitoring device used in Example 4.

In regard to the diagnosis and monitoring device 210, further, this diagnosis and monitoring device 210, as shown in FIG. 20, has a database part 211, a diagnosis part 212, and a communication part 213.

The database part 211 is composed of a status history database 211*a* and an alert history database 211*b*.

The plant status information dc outputted from the plant control system 1 and inputted via the communication device 240 and the network 250 is stored in the status history database 211*a* in chronological order. Primary keys are an apparatus name and a status name.

The plant alert information da1 outputted from the plant control system 1 and inputted via the communication device 240 and the network 250, and the plant alert information da2 generated according to the determination of the diagnosis part 122 that there is an abnormality or a sign of an abnormality in the plant are stored in the alert history database 211*b* in chronological order. Primary key is an apparatus name.

A diagnosis program is installed in the diagnosis part 212. The diagnosis part 212 diagnoses the inputted plant status information dc by means of the diagnosis program, thereby determining the presence or absence of an abnormality or a sign of an abnormality of the plant, and generates the plant alert information da2 if it is determined that there is an abnormality or a sign of an abnormality. This plant alert information da2 is stored in the alert history database 211*b*, and also transmitted to the fault inspection management device 220.

It should be noted that as the diagnosis program itself, a suitable diagnosis program can be installed according to the intended use. For example, as the diagnosis program, there are a program diagnosing a system load, a program diagnosing a combustion oscillation of a combustor, and the like.

As the diagnosis program installed in the diagnosis part 212, a program appropriate for an apparatus or for a plant configuration can be selected, such as a deterministic diagnosis program, or a stochastic/inferential diagnosis program.

It should be noted that when the stochastic/inferential diagnosis program is used to make a stochastic/inferential diagnosis, the plant apparatus configuration information D1 and the fault inspection information D2 of the past stored in the fault inspection management device 220 are taken in, and a stochastic/inferential diagnosis is made with reference to the taken-in information.

The communication device 213 is composed of a communication program and a communication medium, and transmits the plant alert information da1, da2 stored in the alert history database 211*b* to the fault inspection management device 220.

The fault inspection management device 220 is a device maintaining the fault inspection information D2 on apparatuses used in the plant.

Figure 21:
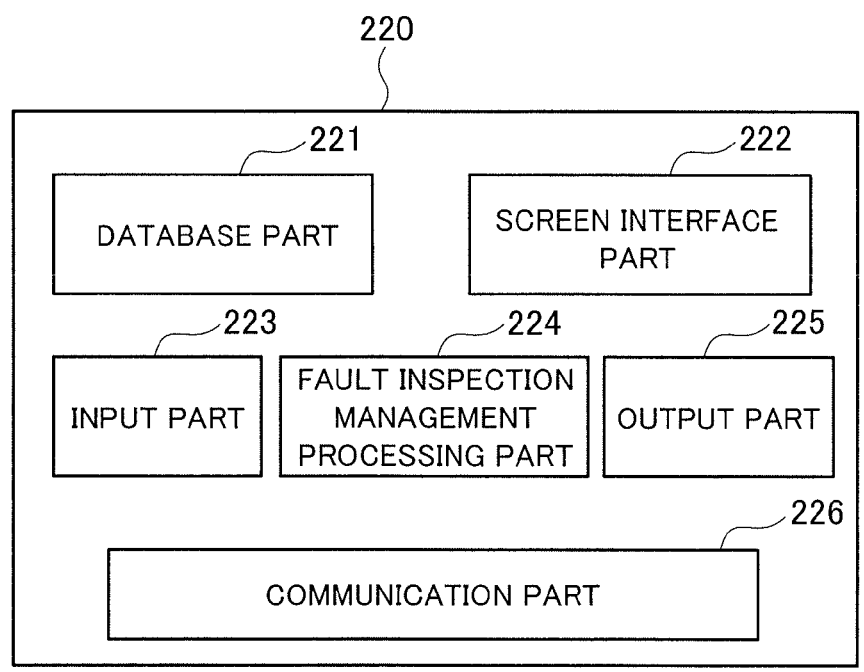
FIG. 21 is a configuration diagram showing a fault inspection management device used in Example 4.

This fault inspection management device 220, as shown in FIG. 21, has a database part 221, a screen interface part 222, an input part 223, a fault inspection management processing part 224, an output part 225, and a communication part 226.

The fault inspection management processing part 224 performs information arithmetic processing, information transmission processing, and the like, of the entire fault inspection management device 220.

For example, when defect information or the like found by a maintenance worker in periodic inspection is inputted as the plant alert information da3 via the input part 223, this plant alert information da3 is transmitted to the database part 221.

The database part 221, as shown in FIG. 22, is composed of a plant apparatus configuration information database 221*a*, an alert information correspondence database 221*b*, and a fault inspection information database 221*c*.

The plant apparatus configuration information D1 is inputted to the fault inspection management device 220, and the plant apparatus information database 121*a* is established by copying/holding this plant apparatus configuration information D1.

The plant apparatus configuration information database 221*a* holding the plant apparatus configuration information D1 holds an apparatus configuration database for each plant, and a component configuration database for each apparatus.

This does not only make it possible to identify which plant is composed of which apparatus, but also makes it possible to conduct a search to find which apparatus is used in which plant.

Further, since the plant apparatus configuration information database 221*a* has the component configuration database for each plant, it is possible to search which component is used in which apparatus even at a component level of each apparatus.

For example, it is possible to conduct a crossover search to find which other apparatus (for example, a flowmeter, a pressure sensor, or the like) uses a capacitor of an arithmetic device board of a DCS (Distributed Control System). Similarly, it is possible to conduct a search to find which plant uses a certain solenoid valve.

The alert information correspondence database 221*b* is established by preliminarily registering/storing a possible cause/site to be inspected with respect to an alert defined in the plant, and a countermeasure against the cause.

It should be noted that defect information or the like found by a maintenance worker in periodic inspection or the like is inputted as the plant alert information da3 from the input part 223, and a code registered in the alert information correspondence database 221*b* is used as an alert information code of this plant alert information da3.

The fault inspection information database 221*c* stores in chronological order as fault inspection reasons the alert information codes indicated by the plant alert information da1, da2 sent from the diagnosis and monitoring device 210 and the plant alert information da3 inputted from the input part 223. Besides, each alert information code (alert information or periodic inspection) holds a person in charge who dealt with the alert indicated by this alert information code, a cause code representing a fault/inspection cause, a countermeasure performed for solving the fault, and a result from this countermeasure.

That is, based on the plant alert information da1, da2 received from the diagnosis and monitoring device 210 and the plant alert information da3 inputted from the input part 223, the alert information correspondence database 221b is searched, and information is set in each of fields of fault inspection reasons, cause codes, and countermeasures.

In addition, the plant apparatus configuration information database 221a is searched from the plant alert information da1, da2, da3, and an apparatus ID of a target apparatus is set in an apparatus ID field. At this time, "before inspection" is registered in a result field.

Regarding date and time, a person in charge, and result, information inputted from the input part 223 by a person in charge who implemented inspection/a countermeasure is received and set.

The fault inspection information D2 organized/stored in the fault inspection information database 221c according to predetermined fault/abnormality classification shows a fault cause or frequency for each apparatus constituting the plant or each component constituting each apparatus.

A fault cause clarified by the fault inspection information D2 is linked with the components database.

For example, regarding a fault that a switch constituting a solenoid valve neither opens nor closes due to sticking, the fault cause called "sticking" is linked with the switch of the solenoid valve. This makes it possible to accumulate data indicating by which component fault and how often the solenoid valve fault is caused.

To sum up, the fault inspection information D2 stored in the fault inspection information database 221c is information in which:

The fault reasons indicated by the plant alert information da1, da2, and the inspection reason/fault reason of a periodic inspection or a response corresponding to the plant alert information da3 are chronologically held;

and in which:

Besides, in which apparatus (component) of the respective apparatuses (respective components) indicated in the plant apparatus configuration information D1 each fault reason/inspection reason occurred;

What the cause of each fault reason/inspection reason was; and

Which person in charge took what kind of counter measure against each fault reason/inspection reason, and what the result of the countermeasure was are accumulated.

The communication part 226 is composed of a communication program and a communication medium, and communicates with the instruction processing device 230.

The screen interface part 222 provides a diagram or a table necessary for a person who issues an instruction for inspection to determine whether or not a written inspection instruction needs to be produced.

For example, the status history database 211a maintained by the diagnosis and monitoring device 210 is accessed, and a trend graph is produced.

Alternatively, a histogram of the number of alerts issued for each apparatus constituting the plant is established from the fault inspection information database 221c, the frequency of abnormalities is provided, or a histogram of each abnormality cause expected in a specific apparatus is provided.

This makes it possible for a person who issues an instruction for inspection to determine whether or not a written inspection instruction needs to be produced, and indicate a specific site to be inspected if the necessity of inspection is determined.

A display software can be a web browser or an exclusive display software.

Figure 23:
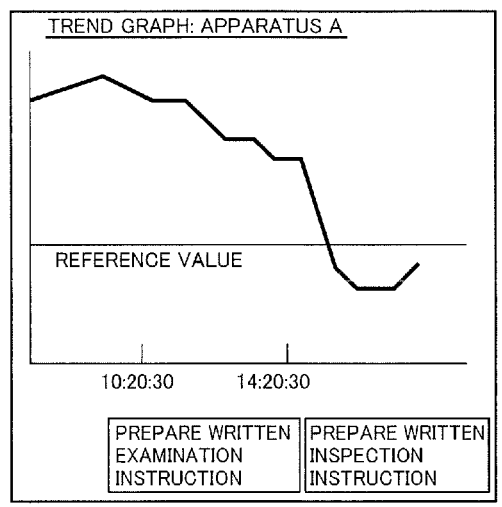
FIG. 23 is a diagram showing an example of display on a screen interface part of the fault inspection management device.
Figure 24:
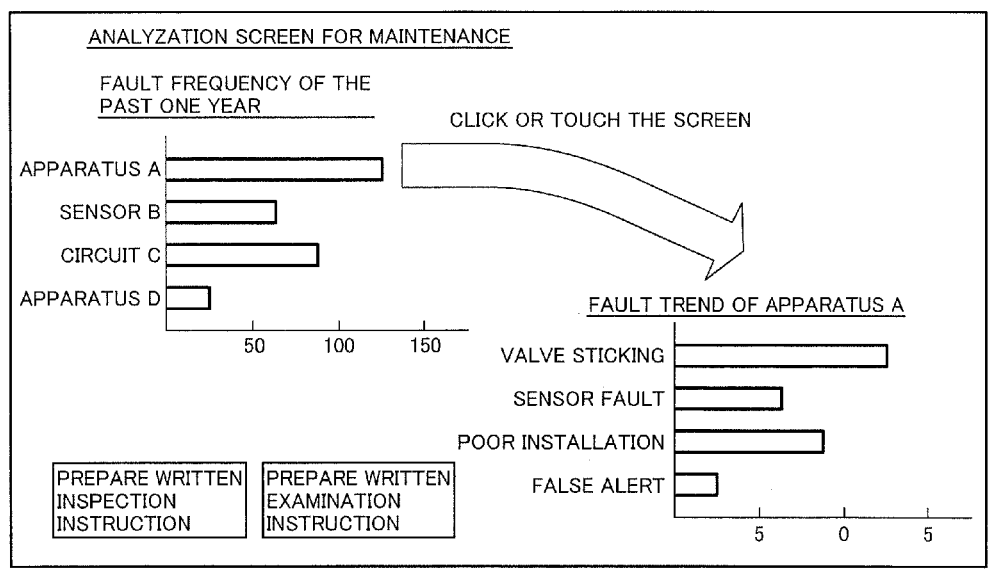
FIG. 24 is a diagram showing an example of display on a screen interface part of the fault inspection management device.

FIG. 23 and FIG. 24 show display examples displayed on the screen interface part 222 of the fault inspection management device 220.

It should be noted that the status history database 211a also stores each status quantity required and its reference value (abnormality determination value) paired therewith. In the case of a parameter whose reference value is determined by some status quantities (for example, in a case where any two of a pressure, a temperature, and a volume determine a reference value of the remaining one in a state equation PV=nRT), a reference value determined by the diagnosis program is displayed.

When a "PREPARE WRITTEN INSPECTION INSTRUCTION" button is pressed, a document of information on an apparatus to be inspected, an item to be inspected, a countermeasure, the number of similar alerts of the past, and the content of a countermeasure performed for each alert of the past is outputted from the output part 225 as a written inspection instruction in a predetermined form.

Further, when the "PREPARE WRITTEN EXAMINATION INSTRUCTION" button is pressed, the fault inspection management processing part 224 produces examination instruction information V, and transmits this examination instruction information V to the instruction processing device 230 via the communication part 226.

The examination instruction information V is organized data of extracted pieces of information necessary for examination from the fault inspection information D2 stored in the fault inspection information database 221c, such as past periodic inspection result information, repair information, a fault cause, a replacement determination result, relating defect information, an inspection site, apparatus replacement information, a past treatments list, or the like.

It should be noted that it is preliminarily determined according to the type or characteristics of the plant which information is extracted/organized from the fault inspection information D2 to make the inspection instruction information V.

The instruction processing device 230 produces the written examination instruction R3 indicating an inspection site/replacement apparatus in a predetermined form to an operator or a maintenance worker of the plant. In addition, the instruction processing device 230 produces the examination result report R4 indicating an examination result in a predetermined form.

The written examination instruction R3 produced by the instruction processing device 230 specifies and indicates an inspection site or an apparatus to be replaced determined on the basis of the fault cause or replacement determination result analyzed by the diagnosis and monitoring device 210, and the plant apparatus configuration information D1 and the fault inspection information D2 stored in the fault inspection management device 220.

Figure 25:
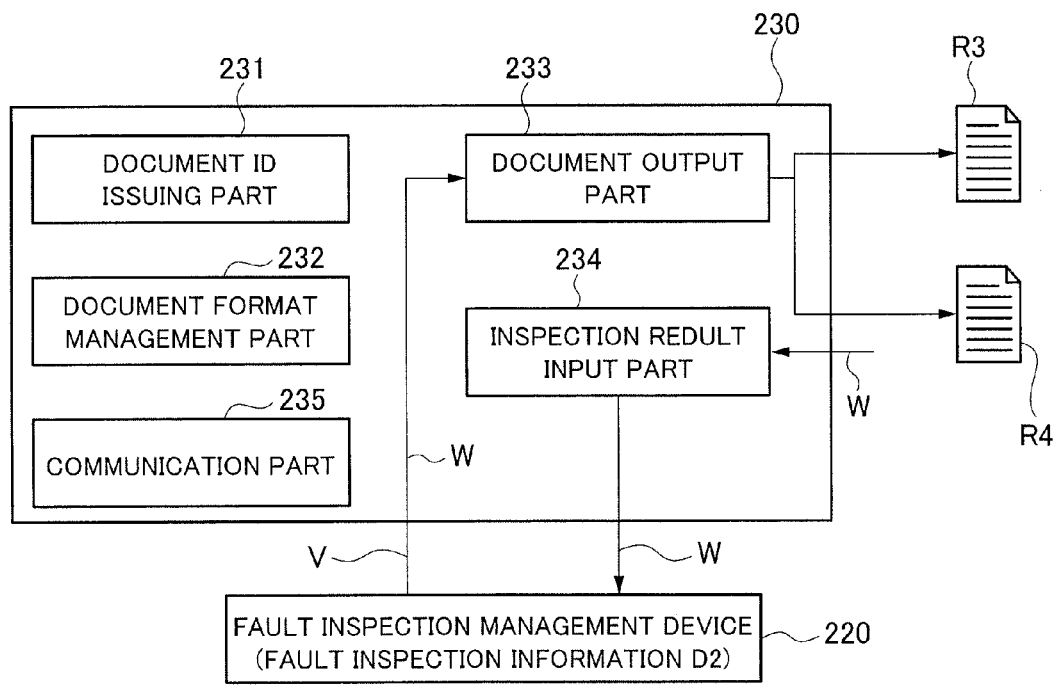
FIG. 25 is a diagram showing an instruction processing device and the fault inspection management device used in Example 4.

Further, regarding the instruction processing device 230, this instruction processing device 230, as shown in FIG. 25, is composed of a document ID issuing part 231, a document format management part 232, a document output part 233, an inspection result input part 234, and a communication part 235.

The document ID issuing part 231 has a program to issue a document number of the written examination instruction R3 and the examination result report R4 issued by the instruction processing device 230. It should be noted that the written examination instruction R3 and the examination result report R4 are electronic files.

The document ID issuing part 231 also has a program to manage the issued number and a location where the electronic file is stored in a paired fashion.

The document format management part 232 has a setting program to store, in a disk, data indicating a storage location of templates of the written examination instruction R3 and the examination result report R4.

The document output part 233 has a document output program.

The communication part 235 is composed of a communication program and a communication medium, and communicates with the fault inspection management device 220.

When an "PREPARE WRITTEN EXAMINATION INSTRUCTION button" is pressed, and the examination instruction information V is transmitted from the fault inspection management device 220 to the instruction processing device 230, the document output program of the document output part 233 is activated.

The document output program activates the document ID issuing part 231 and causes the same to produce a document number. At this time, the document ID issuing part 231 activates the setting program of the document format management part 232 to obtain a template file.

The document output program inputs a document ID, and the examination instruction information V received from the fault inspection management device 220 into the template file. After the input to the template file, the document output program delivers the inputted file to the document ID issuing part 231.

The document ID issuing part 231 performs processing to move the delivered file to a predetermined disk, and performs processing to memorize a storage directory in a paired fashion with the issued ID. After the series of processing is completed, the document ID issuing part 231 informs the document output part 233 of a storage location.

The document output part 233 passes a stored directory path to a printing device, and issues a printing command to a printing device. According to this, the examination instruction information V is organized in a predetermined format, produced as the written examination instruction R3, and outputted from the document output part 233.

An examiner (an operator or a maintenance worker) examines examination items indicated in the written examination instruction R3.

After the examination is completed, the examiner inputs examination result information W to the instruction processing device 230 through the inspection result input part 234.

The examination result information W inputted to the instruction processing device 230 is transmitted to the fault inspection management device 220, and registered in the fault inspection information D2 of the fault inspection information database 221c. That is, the inspection result input part 234 accesses the fault inspection information database 221c and performs update processing.

After the processing to update the examination result information of the fault inspection database 221c is completed, the fault inspection management device 220 transmits the examination result information W to the instruction processing device 230, and simultaneously activates the document output part 233. Then, according to the same procedure as the examination instruction preparation R3, the examination result information W is organized in a predetermined format, produced as the examination result report R4, and outputted from the document output part 233.

When a fault occurs, such information relating to fault frequency helps an expert who knows the details of the plant specify the fault cause, or helps to narrow down a matter to be focused on until an inspector arrives at the site, and further, a designer/manufacturer can make use of the information to determine whether or not a design change or component replacement is required. The information can be generally used across each lifecycle phase, and is useful in performing immediately and efficiently coordinated activities.

EXAMPLE 5

Next, an application of the plant monitoring and maintenance assistance device 200 of Example 4 to a plurality of plants will be described as Example 5. It should be noted that the description of the configuration of Example 4 is applied to that of Example 5.

Example 4 is intended for only a single plant.

In practice, however, it is common to monitor and maintain a plurality of plants. In addition, in a plurality of plants, identical apparatuses having different serial numbers are often used, and similar alerts might be issued from different plants.

Therefore, Example 4 is expanded so as to be simultaneously applied to a plurality of plants, and Example 5 is defined as this expansion of Example 4.

In Example 5, specifically, fields of plant IDs and plant names are added to the following database.

That is, fields of plant IDs and plant names are added to the status history database 211a and the alert history database 211b of the diagnosis and monitoring device 210 and the plant apparatus configuration information database 221a and the fault inspection information database 221c of the fault inspection management device 220.

The display of the screen interface part 222 of the fault inspection management device 220 is configured not only to be capable of providing a trend graph or an apparatus fault histogram for each plant, but also to be capable of providing a fault histogram or a cause-specific histogram for each apparatus of all plants.

In addition, when the "PREPARE WRITTEN INSPECTION INSTRUCTION" button is pressed, information on the number of similar alerts in another plant of the past and the contents of implemented countermeasures in each case is additionally transmitted as an inspection instruction to the instruction processing device 230.

In Example 5, the following actions/effects can be achieved.

A person who issues an instruction for inspection can grasp the fault frequency of a specific apparatus from even an alert which less frequently occurs on a plant-by-plant basis, and therefore can specify an apparatus to which attention must be paid.

In addition, even when a certain alert is issued for the first time for a certain plant, an inspector can make a reference about the presence or absence of occurrence of the alert in another plant and the countermeasure of that time, and therefore can respond immediately.

EXAMPLE 6

Next, a modification of Example 4 in terms of some of the configuration/behavior of the plant monitoring and maintenance assistance device 200 will be described as Example 6.

In Example 4, it is assumed that the written examination instruction R3 is outputted as a printed paper, and the inspection result information W is inputted from the instruction processing device 230.

Nowadays, however, a maintenance worker dispatched to the site can carry a mobile phone or a portable terminal. Therefore, the system presented in Example 4 is expanded so as to adapt to such a case, and Example 6 is defined as this expansion of Example 4.

In Example 6, as shown in FIG. 26, a portable terminal for a maintenance worker 260 is added. In addition, the instruction processing device 230 organizes an information format of the examination instruction information V into a format of the written examination instruction R3, and wirelessly transmits the same as written examination instruction information Va.

Therefore, the portable terminal 260 carried by the maintenance worker can receive the written examination instruction information Va, and can display information similar to the written examination instruction R3 on the screen.

Further, the examination result information W can be wirelessly transmitted from the portable terminal 260, and received by the instruction processing device 230.

In addition, depending on the content of an alert, an operator can deal with the alert without dispatching a maintenance worker to the site. In that case, the written examination instruction information Va is outputted from the instruction processing device 230 and transmitted to the plant control system 1 via the communication device 240.

Thus, it is possible to directly provide the content of an examination instruction to the operator via the plant control system 1.

In Example 6, since a maintenance worker can directly receive an examination instruction on the portable terminal 260 without waiting for the written examination instruction R3 outputted from the instruction processing device 230, the maintenance worker can arrive at the site earlier. In addition, it is possible to input an examination result directly to the portable terminal 260 at the site, thereby making an inspection result report more quickly.

REFERENCE SIGNS LIST

1 Plant control system
100, 100a, 100b Plant safety design assistance device
110 Diagnosis and monitoring device
120 Fault inspection management device
130 Design and manufacturing device
140 Communication device
150 Network
160 Requirement management device
170 Customer support management device
200 Plant monitoring and maintenance assistance device
210 Diagnosis and monitoring device
220 Fault inspection management device
230 Instruction processing device
240 Communication device
250 Network
260 Portable terminal

The invention claimed is:

1. A plant safety design assistance device, wherein:
a communication device, a diagnosis and monitoring device, a fault inspection management device, and a design and manufacturing device are interconnected via a network;
the communication device transmits plant status information indicating status of a plant and first plant alert information indicating an abnormality, a fault, or a danger of the plant, the plant status information and the first plant alert information being outputted from a plant control system controlling operation of the plant;
the diagnosis and monitoring device stores the plant status information transmitted via the communication device, generates second plant alert information if a diagnosis program determined that an abnormality or a sign of an abnormality is present in the plant by diagnosing the plant status information, further stores the first plant alert information transmitted via the communication device and the second plant alert information, and transmits the first plant alert information and the second plant alert information to the fault inspection management device;
the fault inspection management device takes in and stores latest plant apparatus configuration information from the design and manufacturing device, and stores and accumulates as fault inspection information the first plant alert information and the second plant alert information transmitted from the diagnosis and monitoring device and a fault reason or an inspection reason indicated by third plant alert information inputted by a maintenance worker, in correspondence to apparatuses indicated by the plant apparatus configuration information and a fault/inspection cause; and
the design and manufacturing device stores the plant apparatus configuration information indicating an apparatus configuration of the plant and fault probability of each apparatus, changes the fault probability of an apparatus of the apparatuses constituting the plant which has failed or has been inspected on basis of the fault inspection information taken in from the fault inspection management device, calculates degree of safety from the fault inspection information taken in and the post-change fault probability of each apparatus, and updates the plant apparatus configuration information into latest information, if the degree of safety of the apparatus of the apparatuses falls below a predetermined degree of safety, by repairing and restoring the apparatus of the plant apparatus configuration information or by replacing the apparatus with another apparatus having a high degree of safety.

2. A plant safety design assistance device, wherein:
a communication device, a diagnosis and monitoring device, a fault inspection management device, a design and manufacturing device, and a requirement management device are interconnected via a network;
the communication device transmits plant status information indicating status of a plant and first plant alert information indicating an abnormality, a fault, or a danger of the plant, the plant status information and the first plant alert information being outputted from a plant control system controlling operation of the plant;
the diagnosis and monitoring device stores the plant status information transmitted via the communication device, generates second plant alert information if a diagnosis program determined that an abnormality or a sign of an abnormality is present in the plant by diagnosing the plant status information, further stores the first plant alert information transmitted via the communication device and the second plant alert information, and transmits the first plant alert information and the second plant alert information to the fault inspection management device;

the fault inspection management device takes in and stores latest plant apparatus configuration information from the design and manufacturing device, and stores and accumulates as fault inspection information the first plant alert information and the second plant alert information transmitted from the diagnosis and monitoring device and a fault reason or an inspection reason indicated by third plant alert information inputted by a maintenance worker, in correspondence to apparatuses indicated by the plant apparatus configuration information and a fault/inspection cause;

the design and manufacturing device stores the plant apparatus configuration information indicating an apparatus configuration of the plant, fault probability and specifications information of each apparatus, changes the fault probability of an apparatus of the apparatuses constituting the plant which has failed or has been inspected on a basis of the fault inspection information taken in from the fault inspection management device, calculates degree of safety from the fault inspection information taken in and the post-change fault probability of each apparatus, updates the plant apparatus configuration information into latest information, if the degree of safety of the apparatus of the apparatuses falls below a predetermined degree of safety, by repairing and restoring the apparatus of the plant apparatus configuration information or by replacing the apparatus with another apparatus having a high degree of safety, registers the specifications information indicated by requirements specifications information when the requirements specifications information has been transmitted from the requirement management device to the design and manufacturing device and transmits specifications change information to the requirement management device when the specifications information has been changed; and the requirement management device transmits the requirements specifications information to the design and manufacturing device.

3. A plant safety design assistance device, wherein:

a communication device, a diagnosis and monitoring device, a fault inspection management device, a design and manufacturing device, a requirement management device, and a customer support management device are interconnected via a network;

the communication device transmits plant status information indicating status of a plant and first plant alert information indicating an abnormality, a fault, or a danger of the plant, the plant status information and the first plant alert information being outputted from a plant control system controlling operation of the plant;

the diagnosis and monitoring device stores the plant status information transmitted via the communication device, generates second plant alert information if a diagnosis program determined that an abnormality or a sign of an abnormality is present in the plant by diagnosing the plant status information, further stores the first plant alert information transmitted via the communication device and the second plant alert information, and transmits the first plant alert information and the second plant alert information to the fault inspection management device;

the fault inspection management device takes in and stores latest plant apparatus configuration information from the design and manufacturing device, and stores and accumulates as fault inspection information the first plant alert information and the second plant alert information transmitted from the diagnosis and monitoring device and a fault reason or an inspection reason indicated by third plant alert information inputted by a maintenance worker, in correspondence to apparatuses indicated by the plant apparatus configuration information and a fault/inspection cause;

the design and manufacturing device stores the plant apparatus configuration information indicating an apparatus configuration of the plant, fault probability of each apparatus, and specifications information, changes the fault probability of an apparatus of the apparatuses constituting the plant which has failed or has been inspected on a basis of the fault inspection information taken in from the fault inspection management device, calculates degree of safety from the fault inspection information taken in and the post-change fault probability of each apparatus, updates the plant apparatus configuration information into latest information, if the degree of safety of the apparatus of the apparatuses falls below a predetermined degree of safety, by repairing and restoring the apparatus of the plant apparatus configuration information or by replacing the apparatus with another apparatus having a high degree of safety, registers the specifications information indicated by requirements specifications information when the requirements specifications information has been transmitted from the requirement management device to the design and manufacturing device, transmits specifications change information to the requirement management device when the specifications information has been changed, further transmits product information to the customer support device, and links defect information to the plant apparatus configuration information and the specifications information when the defect information has been transmitted from the customer support device to the design and manufacturing device;

the customer support device transmits a customer request item to the requirement management device; and the requirement management device transmits requirements specifications information satisfying the customer request item to the design and manufacturing device.

4. A plant monitoring and maintenance assistance device, wherein:

a communication device a diagnosis and monitoring device, a fault inspection management device, and an instruction processing device are interconnected via a network;

the communication device transmits plant status information indicating status of a plant and first plant alert information indicating an abnormality, a fault, or a danger of the plant, the plant status information and the first plant alert information being outputted from a plant control system controlling operation of the plant;

the diagnosis and monitoring device stores the plant status information transmitted via the communication device, generates second plant alert information if a diagnosis program determined that an abnormality or a sign of an abnormality is present in the plant by diagnosing the plant status information, further stores the first plant alert information transmitted via the communication device and the second plant alert information, and transmits the first plant alert information and the second plant alert information to the fault inspection management device;

the fault inspection management device stores plant apparatus configuration information, stores and accumulates as fault inspection information the first plant alert information and the second plant alert information transmitted from the diagnosis and monitoring device and a fault reason or an inspection reason indicated by third plant alert information inputted by a maintenance worker, in correspondence to apparatuses indicated by the plant apparatus configuration information and a fault/inspection cause, and further takes out information necessary for examination from the fault inspection information and transmits the information necessary for examination as examination instruction information to the instruction processing device;

the instruction processing device converts the transmitted examination instruction information into a predetermined format and produces and outputs the examination instruction information in the predetermined format as a written examination instruction; and the diagnosis program of the diagnosis and monitoring device generates the second plant alert information by making a stochastic/inferential diagnosis with reference to the plant apparatus configuration information and the fault inspection information.

5. The plant monitoring and maintenance assistance device according to claim 4, wherein the plant apparatus configuration information of the fault inspection management device holds an apparatus configuration database for each plant, and a component configuration database for each apparatus.

6. The plant monitoring and maintenance assistance device according to claim 4, wherein the diagnosis and monitoring device stores the plant status information for each plant transmitted via the communication device, generates second plant alert information for each plant if a diagnosis program determined that an abnormality or a sign of an abnormality is present in the plant by diagnosing the plant status information for each plant, and the fault inspection management device stores plant apparatus configuration information for each plant, stores and accumulates as fault inspection information for each plant the first plant alert information and the second plant alert information transmitted from the diagnosis and monitoring device and a fault reason or an inspection reason indicated by third plant alert information inputted by a maintenance worker, in correspondence to apparatuses indicated by the plant apparatus configuration information for each plant and a fault/inspection cause.

7. A plant monitoring and maintenance assistance device, wherein:

a communication device, a diagnosis and monitoring device, a fault inspection management device, and an instruction processing device are interconnected via a network;

the communication device transmits plant status information indicating status of a plant and first plant alert information indicating an abnormality, a fault, or a danger of the plant, the plant status information and the first plant alert information being outputted from a plant control system controlling operation of the plant;

the diagnosis and monitoring device stores the plant status information transmitted via the communication device, generates second plant alert information if a diagnosis program determined that an abnormality or a sign of an abnormality is present in the plant by diagnosing the plant status information, further stores the first plant alert information transmitted via the communication device and the second plant alert information, and transmits the first plant alert information and the second plant alert information to the fault inspection management device;

the fault inspection management device stores plant apparatus configuration information, stores and accumulates as fault inspection information the first plant alert information and the second plant alert information transmitted from the diagnosis and monitoring device and a fault reason or an inspection reason indicated by third plant alert information inputted by a maintenance worker, in correspondence to apparatuses indicated by the plant apparatus configuration information and a fault/inspection cause, and further takes out information necessary for examination from the fault inspection information and transmits the information necessary for examination as examination instruction information to the instruction processing device;

the instruction processing device converts the transmitted examination instruction information into a predetermined format and produces and outputs the examination instruction information in the predetermined format as a written examination instruction, and performs information organization of an information format of the examination instruction information into a format of the written examination instruction and wirelessly transmits the organized information as information of a written examination instruction to a portable terminal; and the diagnosis program of the diagnosis and monitoring device generates the second plant alert information by making a stochastic/inferential diagnosis with reference to the plant apparatus configuration information and the fault inspection information.

8. The plant monitoring and maintenance assistance device according to claim 7, wherein the plant apparatus configuration information of the fault inspection management device holds an apparatus configuration database for each plant, and a component configuration database for each apparatus.

9. The plant monitoring and maintenance assistance device according to claim 7, wherein the diagnosis and monitoring device stores the plant status information for each plant transmitted via the communication device, generates second plant alert information for each plant if a diagnosis program determined that an abnormality or a sign of an abnormality is present in the plant by diagnosing the plant status information for each plant, and the fault inspection management device stores plant apparatus configuration information for each plant, stores and accumulates as fault inspection information for each plant the first plant alert information and the second plant alert information transmitted from the diagnosis and monitoring device and a fault reason or an inspection reason indicated by third plant alert information inputted by a maintenance worker, in correspondence to apparatuses indicated by the plant apparatus configuration information for each plant and a fault/inspection cause.

* * * * *